United States Patent
Kanai

(10) Patent No.: US 7,561,985 B2
(45) Date of Patent: Jul. 14, 2009

(54) MAINTENANCE MEDIATION APPARATUS, MAINTENANCE TARGET APPARATUS MAINTENANCE METHOD, AND MAINTENANCE SYSTEM

(75) Inventor: Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 82 days.

(21) Appl. No.: 11/691,820

(22) Filed: Mar. 27, 2007

(65) Prior Publication Data

US 2008/0133179 A1    Jun. 5, 2008

Related U.S. Application Data

(63) Continuation of application No. 11/209,797, filed on Aug. 24, 2005, now Pat. No. 7,216,059.

(30) Foreign Application Priority Data

| Aug. 25, 2004 | (JP) | ............................. 2004-245527 |
| Jun. 14, 2005 | (JP) | ............................. 2005-174362 |
| Aug. 19, 2005 | (JP) | ............................. 2005-238755 |

(51) Int. Cl.
    *G06F 19/00*     (2006.01)
    *G06F 17/40*     (2006.01)

(52) U.S. Cl. ........................................... 702/182; 702/188
(58) Field of Classification Search ................. 702/184, 702/177, 182, 188; 701/30
See application file for complete search history.

(56) References Cited

U.S. PATENT DOCUMENTS

| 5,335,048 | A | 8/1994 | Takano et al. |
| 6,289,450 | B1 | 9/2001 | Pensak et al. |
| 6,647,388 | B2 | 11/2003 | Numao et al. |
| 7,124,059 | B2 * | 10/2006 | Wetzer et al. ................ 702/184 |
| 7,180,620 | B2 * | 2/2007 | Shibata ....................... 358/1.15 |
| 2002/0072922 | A1 | 6/2002 | Suzuki et al. |
| 2004/0125402 | A1 | 7/2004 | Kanai et al. |
| 2004/0128555 | A1 | 7/2004 | Saitoh et al. |
| 2005/0021980 | A1 | 1/2005 | Kanai |
| 2005/0114677 | A1 | 5/2005 | Kanai |
| 2005/0141010 | A1 | 6/2005 | Kanai |
| 2005/0144469 | A1 | 6/2005 | Saitoh |
| 2005/0171914 | A1 | 8/2005 | Saitoh |

FOREIGN PATENT DOCUMENTS

| EP | 0 709 783 A1 | 5/1996 |
| EP | 1 072 978 A1 | 1/2001 |
| JP | 2000-132364 A | * 5/2000 |

* cited by examiner

*Primary Examiner*—Edward R Cosimano
*Assistant Examiner*—Douglas N Washburn
(74) *Attorney, Agent, or Firm*—Oblon, Spivak, McClelland, Maier & Neustadt, P.C.

(57) ABSTRACT

A maintenance mediation apparatus mediating maintenance information includes a maintenance center giving an instruction for a maintenance operation to maintenance target apparatuses connected thereto through a network. The maintenance mediation apparatus includes a reception part receiving the maintenance operation instruction information from the maintenance center; a maintenance policy database storing a maintenance policy defining at least one of whether to authorize the maintenance operation on the corresponding maintenance target apparatus by the maintenance center and whether to authorize transmission of each item of usage condition information of the corresponding maintenance target apparatus to the maintenance center; a determination part determining whether to execute the maintenance operation referring to the maintenance policy database; and a transmission part transmitting the received maintenance operation instruction information to the corresponding maintenance target apparatus based on the result of the determination by the determination part.

5 Claims, 17 Drawing Sheets

FIG.3A

MAINTENANCE INFORMATION PROVISION POLICY

| AUTOMATIC PROVISION INTERVAL | 30 | | |
|---|---|---|---|
| UNIT | MIN. | | |
| PERIODICALLY PROVIDED USAGE CONDITION INFORMATION | MACHINE NUMBER | | |
| | COPY COUNTER | | |
| | AMOUNT OF RESIDUAL TONER | | |
| MAINTENANCE INFORMATION TYPE | | AUTHORIZATION/PROHIBITION | |
| MACHINE NUMBER | | AUTHORIZED | |
| IP ADDRESS | | PROHIBITED | |
| MAC ADDRESS | | PROHIBITED | |
| FIRMWARE VERSION | | AUTHORIZED | |
| COPY COUNTER | | AUTHORIZED | |
| AMOUNT OF RESIDUAL TONER | | AUTHORIZED | |
| ... | | ... | |

FIG.3B

MAINTENANCE OPERATION AUTHORIZATION POLICY

| MAINTENANCE OPERATION TYPE | AUTHORIZATION/PROHIBITION |
|---|---|
| MACHINE REBOOTING | AUTHORIZED |
| HDD FORMATTING | PROHIBITED |
| ADDRESS BOOK INITIALIZATION | PROHIBITED |
| ADMINISTRATOR PASSWORD INITIALIZATION | PROHIBITED |
| MAINTENANCE INFORMATION RETRIEVAL | AUTHORIZED |
| ... | ... |

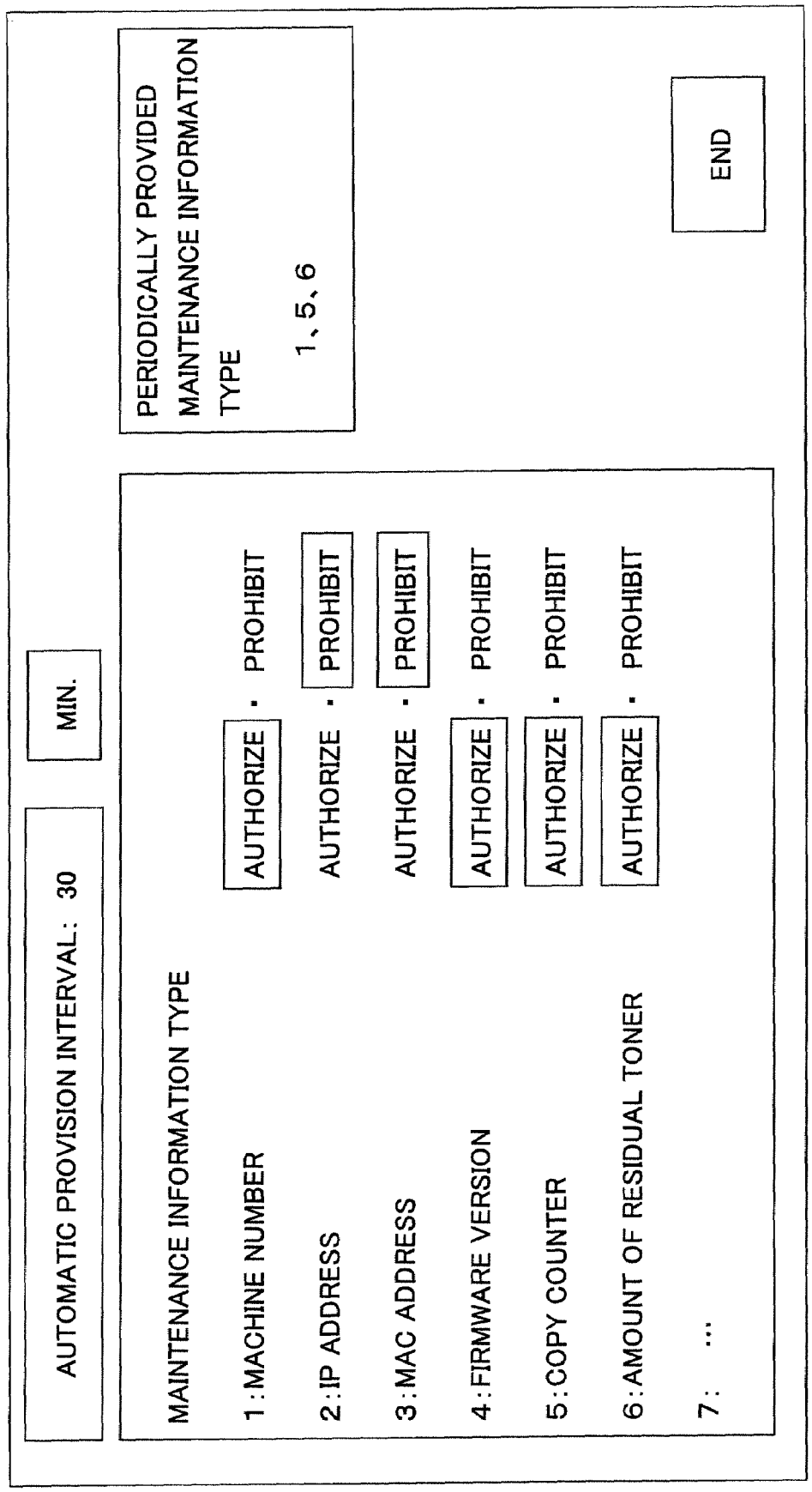

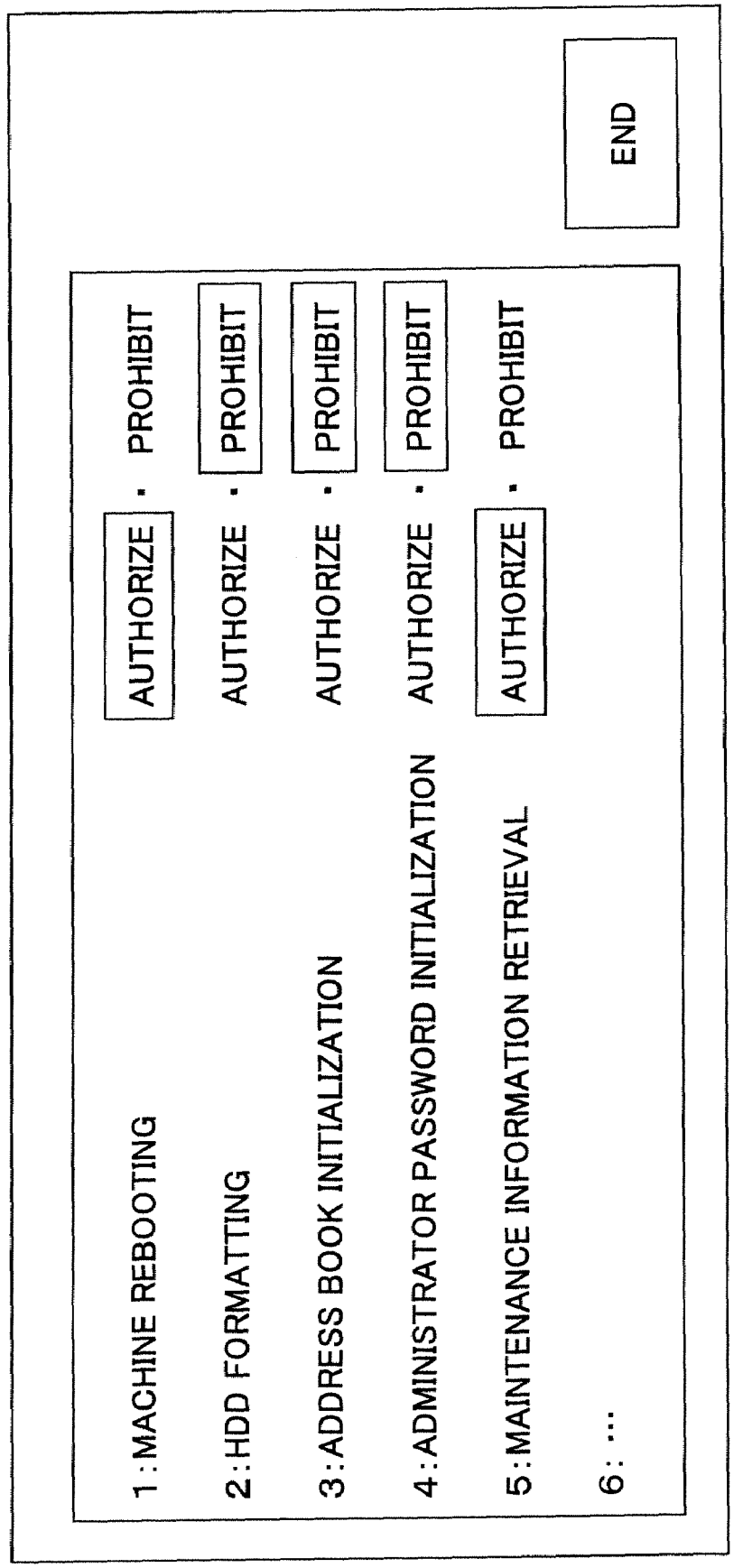

FIG.6

```xml
<?xml version="1.0" encoding="UTF-8" ?>
- <RemoteMaintenancePolicy>
- <InfoProvisionPolicy>
- <AutoProvision>
- <Interval>
  <Value>30</Value>
  <Unit>min</Unit>
  </Interval>
- <InfoList>
  <Name>Machine Number</Name>
  <Name>Copy Counter</Name>
  <Name>Toner Amount</Name>
  </InfoList>
  </AutoProvision>
- <PolicyElement>
  <Name>Machine Number</Name>
  <Permission>allowed</Permission>
  </PolicyElement>
- <PolicyElement>
  <Name>IP Address</Name>
  <Permission>denied</Permission>
  </PolicyElement>
- <PolicyElement>
  <Name>MAC Address</Name>
  <Permission>denied</Permission>
  </PolicyElement>
- <PolicyElement>
  <Name>Firmware Versions</Name>
  <Permission>allowed</Permission>
  </PolicyElement>
- <PolicyElement>
  <Name>Copy Counter</Name>
  <Permission>allowed</Permission>
  </PolicyElement>
- <PolicyElement>
  <Name>Toner Amount</Name>
  <Permission>allowed</Permission>
  </PolicyElement>
  </InfoProvisionPolicy>
- <RemoteOperationPolicy>
- <PolicyElement>
  <Name>Machine Rebooting</Name>
  <Permission>allowed</Permission>
  </PolicyElement>
- <PolicyElement>
  <Name>HDD Formatting</Name>
  <Permission>denied</Permission>
  </PolicyElement>
- <PolicyElement>
  <Name>Address Book Initialization</Name>
  <Permission>denied</Permission>
  </PolicyElement>
- <PolicyElement>
  <Name>Administrator Password Initialization</Name>
  <Permission>denied</Permission>
  </PolicyElement>
- <PolicyElement>
  <Name>Maintenance Info Retrieval</Name>
  <Permission>allowed</Permission>
  </PolicyElement>
  </RemoteOperationPolicy>
  </RemoteMaintenancePolicy>
```

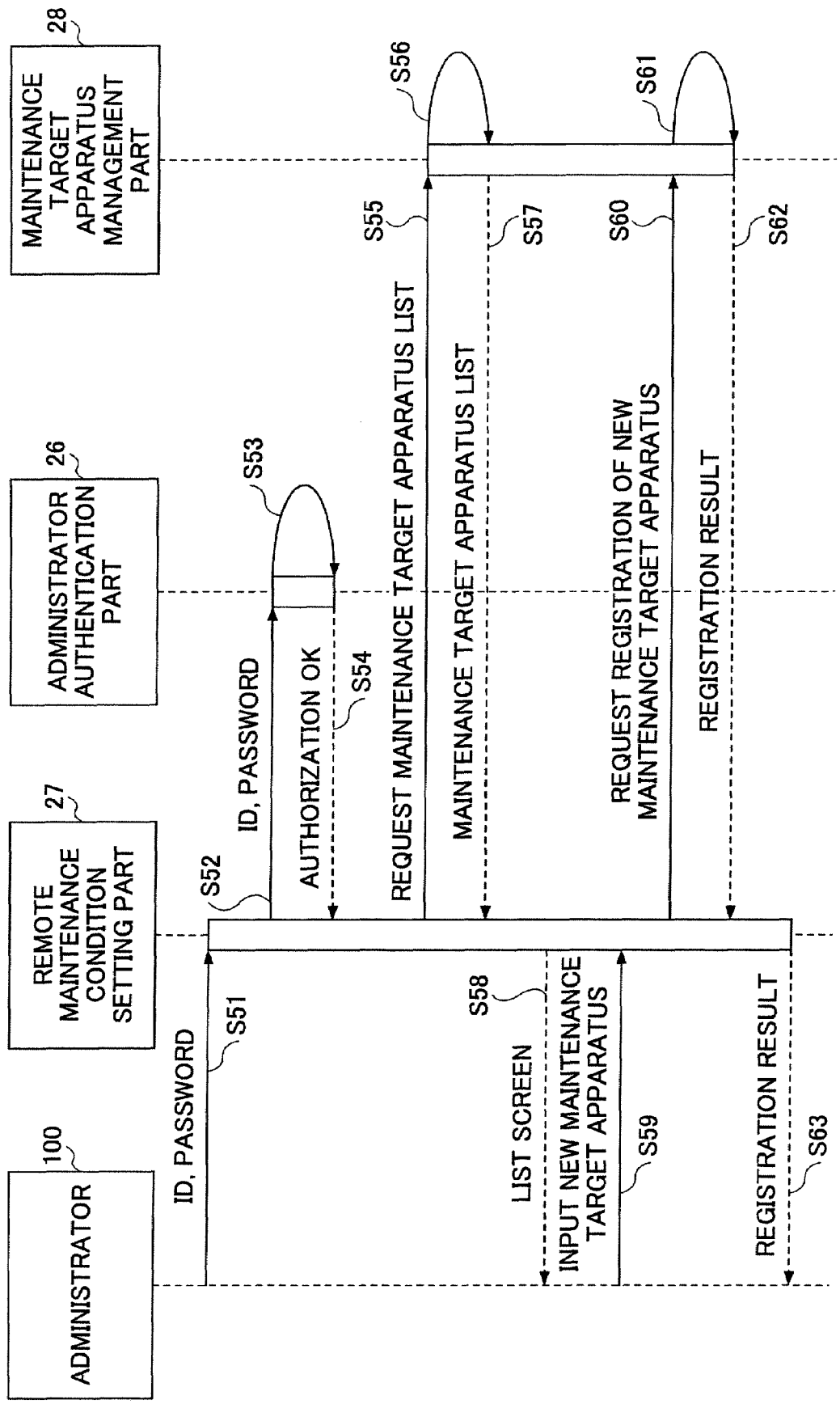

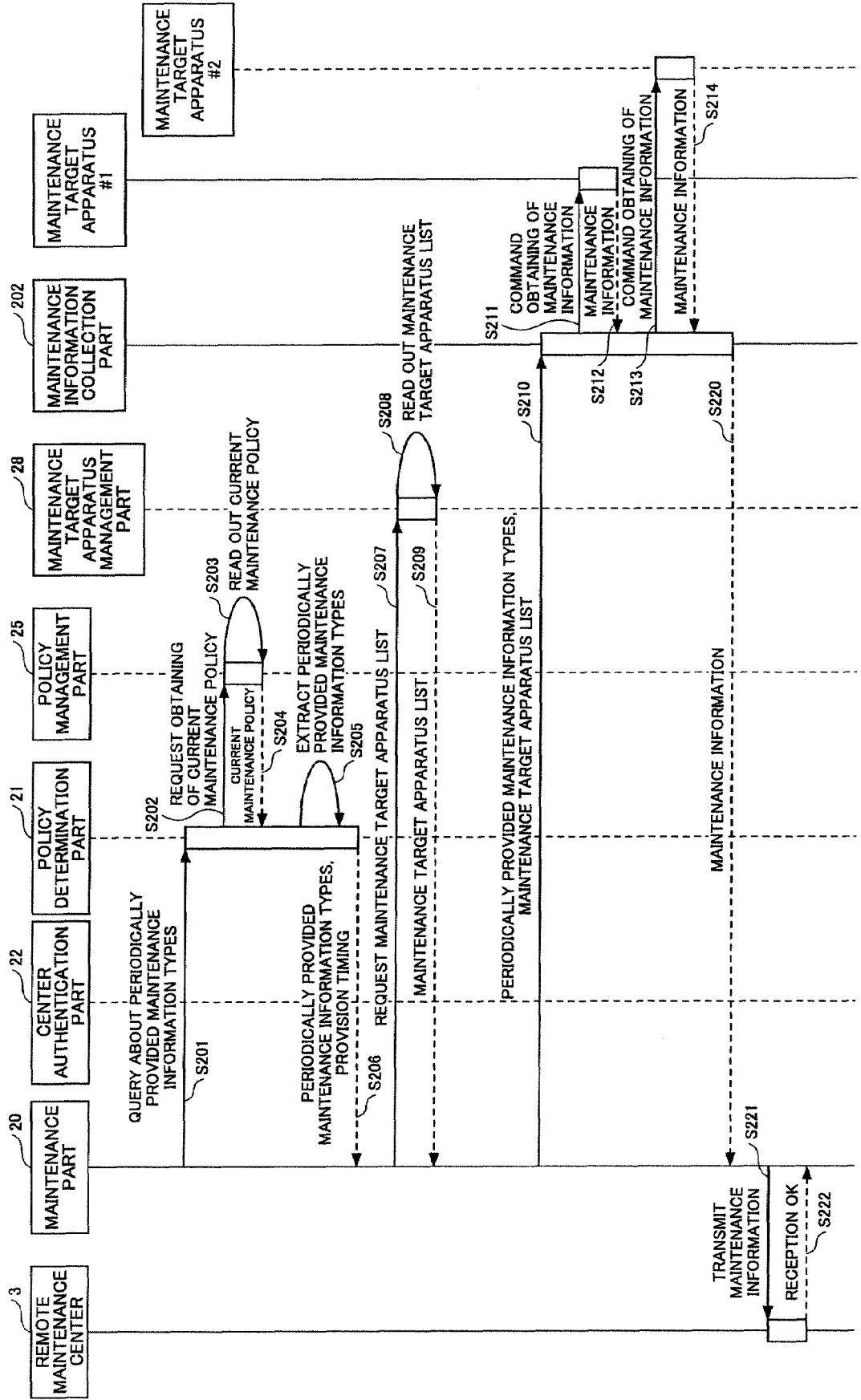

FIG.10

■PERIODIC AUTOMATIC PROVISION OF MAINTENANCE INFORMATION

```
AutoProvision() {
    OPEN MAINTENANCE POLICY FILE AND READ MAINTENANCE POLICY DATA (XML DATA) INTO MEMORY
    BELOW <InfoProvisionPolicy> ELEMENT IN XML DATA,
    BELOW <AutoProvision> ELEMENT,
    OBTAIN AUTOMATIC PROVISION INTERVAL FROM <Interval> ELEMENT
    OBTAIN LIST OF INFORMATION TYPES ENUMERATED BELOW <InfoList> ELEMENT
    while (UNTIL MAINTENANCE POLICY IS CHANGED){
        OBTAIN MAINTENANCE TARGET APPARATUS LIST
        for (EACH MAINTENANCE TARGET APPARATUS){
            for (EACH INFORMATION TYPE OF OBTAINED INFORMATION TYPE LIST){
                OBTAIN MAINTENANCE INFORMATION CORRESPONDING TO INFORMATION TYPE FROM MAINTENANCE TARGET APPARATUS
            }
            TRANSMIT OBTAINED MAINTENANCE INFORMATION TO REMOTE MAINTENANCE CENTER (sendMaintenanceInfo())
            WAIT FOR AUTOMATIC PROVISION INTERVAL
        }
    }
}
```

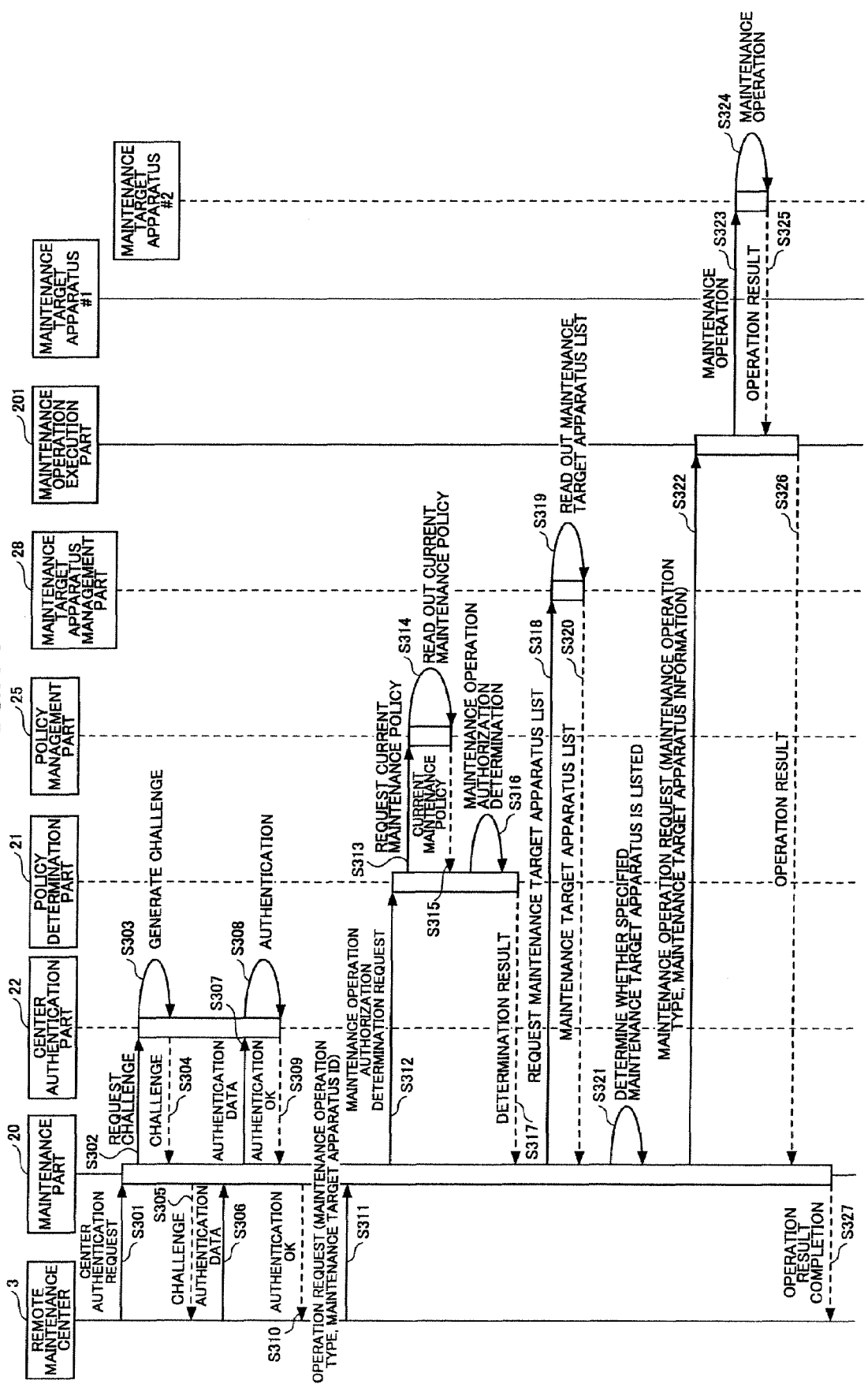

FIG.12

■MAINTENANCE OPERATION REQUEST
SPECIFY MAINTENANCE TARGET APPARATUS WITH targetId SINCE MULTIPLE APPARATUSES CAN BE TREATED AS MAINTENANCE TARGET APPARATUSES ← 401
performRemoteOperation(String session, String targetId, String operation, Parameter[] params):
OperationResult result Paramter TYPE {
    String name; ←PARAMETER NAME
    String value; ←PARAMETER VALUE
};    ← 402

OperationResult TYPE {
    String error; ←ERROR CODE IS STORED IN CASE OF ERROR
    Parameter[] results; ←VARIOUS OPERATION RESULTS ARE STORED
};

targetId = "23094203-777635";    ← 403
operation = "Machine Rebooting";
params[0].name = "TIME";
params[0].value = "NOW";

operation = "Maintenance Info Retrieval";    ← 404
params[0].name = "INFO TYPE";
params[0].value = "ALL";

FIG.13A

```
OperationResult performRemoteOperation(String session, String targetId, String operation, Parameter[] params) {
    DETERMINE WHETHER SESSION IS VALID
    if(NOT VALID){
        ERROR CODE = "BAD_SESSION_ERROR";
        RETURN ERROR CODE AND END;
    }
    POLICY DETERMINATION RESULT=isAllowedOperation(operation, params);
    if(POLICY DETERMINATION RESULT IS "UNAUTHORIZED"){
        ERROR CODE = "NOT_PERMITTED";
        RETURN ERROR CODE AND END;
    }
    OBTAIN MAINTENANCE TARGET APPARATUS LIST
    if(APPARATUS INDICATED BY targetId IS NOT INCLUDED IN MAINTENANCE TARGET APPARATUS LIST){
        ERROR CODE = "TARGET_NOT_EXIST";
        RETURN ERROR CODE AND END;
    }
    result = performOperation(operation, TARGET APPARATUS IP ADDRESS, params);
    return result;
}
```

FIG.13B

```
boolean isAllowedOperation(String operation, Parameter[] params) {
    OPEN MAINTENANCE POLICY FILE AND READ MAINTENANCE POLICY DATA (XML DATA) INTO MEMORY
    BELOW <RemoteMaintenancePolicy> ELEMENT IN XML DATA,
    BELOW <RemoteOperationPolicy> ELEMENT,
    SEARCH FOR <PolicyElement> ELEMENT BELOW WHICH <Name> ELEMENT CONTENTS MATCH operation
    if(NO MATCHING ELEMENT){
        RETURN false ("UNAUTHORIZED") AND END;
    }
    if(MATCHING ELEMENT EXISTS){
        REFER TO CONTENTS OF <Permission> ELEMENT BELOW MATCHING ELEMENT
        if(allowed){
            RETURN true ("AUTHORIZED") AND END;
        }
        else{
            RETURN false ("UNAUTHORIZED") AND END
        }
    }
}
```

FIG.14

```
OperationResult performOperation(String operation, String ipAddress, Parameter[] params) {
    ESTABLISH CONNECTION TO TARGET APPARATUS INDICATED BY ipAddress ON NETWORK
    if(operation IS "Machine Rebooting"){
        REFER TO params AND OBTAIN REBOOTING TIME
        ISSUE REBOOTING INSTRUCTION WITH SPECIFIED TIME TO TARGET APPARATUS
        RETURN OPERATION RESULT AND END;
    }
    else if(operation IS "HDD Formatting"){
        ISSUE HDD FORMATTING INSTRUCTION TO TARGET APPARATUS
        RETURN OPERATION RESULT AND END;
    }
    else if(operation IS "Maintenance Info Retrieval"){
        RETRIEVE MAINTENANCE INFORMATION FROM TARGET APPARATUS
        RETURN RETRIEVED MAINTENANCE INFORMATION AND END;
    }
    else if(. . . ){
        . . .
    }
    ERROR CODE = "INVALID_OPERATION"
    RETURN ERROR CODE AND END
}
```

MAINTENANCE MEDIATION APPARATUS, MAINTENANCE TARGET APPARATUS MAINTENANCE METHOD, AND MAINTENANCE SYSTEM

INCORPORATION BY REFERENCE

This application is a continuation of and is based upon and claims the benefit of priority under 35 U.S.C. § 120 for U.S. Ser. No. 11/209,797, filed Aug. 24, 2005 (now U.S. Pat. No. 7,216,059) and claims the benefit of priority under 35 U.S.C. § 119 from Japanese Patent Application No. 2004-245527, filed Aug. 25, 2004, Japanese Patent Application No. 2005-174362, filed Jun. 14, 2005, Japanese Patent Application No. 2005-238755, filed Aug. 19, 2005, the entire contents of each of which are incorporated herein by reference.

BACKGROUND OF THE INVENTION

1. Field of the Invention

The present invention relates generally to maintenance mediation apparatuses, maintenance target apparatus maintenance methods, and maintenance systems, and more particularly to a maintenance mediation apparatus, a maintenance target apparatus maintenance method, and a maintenance system that can remotely maintain multiple apparatuses to be maintained in accordance with a consistent maintenance policy through a network.

2. Description of the Related Art

Products such as a digital multifunction product and an electronic document management system require periodic maintenance such as state monitoring and software updating in order to prevent the occurrence of failure after introduction of the products by an administrator. Conventionally, remote maintenance services are provided because it is not efficient to perform maintenance operations where the products are installed.

In the conventional remote maintenance services, a telephone line is connected to a digital multifunction product (apparatus) to be maintained, and a maintenance operation is performed through the telephone line from the apparatus to be maintained. For instance, Japanese Laid-Open Patent Application No. 2000-132364 discloses a remote system that enables suitable maintenance to be provided without a service person visiting the location of an administrator. According to this remote system, abnormalities in an apparatus are detected and the contents of the abnormalities are classified in a remote place, so that suitable maintenance can be provided in accordance with the classified contents of the abnormalities.

When the configuration of such a remote system is studied, with recent popularization of networks, it is also considered to connect the apparatus to be maintained to a network. If it is possible to provide remote maintenance through not only a telephone line but also a network, it is possible to maintain an apparatus to be maintained through the network, thus resulting in many advantages. For instance, it is possible to deal with failure instantaneously.

However, granting free access to a user apparatus through a network entails many inconveniences in terms of security. Further, sense of security and a required level of security differ among users. Accordingly, it is difficult to uniformly determine how to maintain an apparatus to be maintained. Therefore, it has been requested that a maintainable range be determined for each user of an apparatus to be maintained and that maintenance be provided through a network in accordance with the maintainable range of each user. That is, in remotely maintainable apparatuses, it is desirable that how to provide maintenance be determined apparatus user by apparatus user.

In view of the above request, it has been proposed to limit a maintainable range at the time of remotely maintaining an apparatus to be maintained by presetting the maintainable range in the apparatus to be maintained. According to this technique, the maintainable range can be set by an authenticated user-side administrator. In the case of remote maintenance, it is possible to prevent maintenance operations other than those set.

According to the above-described technique, however, there is no disclosure of a method of writing a maintainable range. Accordingly, how to set a maintainable range in accordance with a user's maintenance policy is not clear.

Further, according to the above-described technique, only a maintenance mode where an apparatus to be maintained is accessed from a remote maintenance center providing maintenance from a remote place is disclosed. It is not assumed that the apparatus to be maintained transmits maintenance information such as the number of copies made and the amount of residual toner to the remote maintenance center. The remote maintenance center has to access all apparatuses to be maintained under its management in order to obtain maintenance information.

In addition, normally, a so-called firewall is provided in the course of accessing an apparatus from an external network. Accordingly, it is difficult to access an apparatus to be maintained and receive maintenance information therefrom through the external network.

Further, it may be assumed that some users have an apparatus to be maintained that has no function of receiving remote maintenance from the remote maintenance center. In this case, it results in an increase in cost to provide such a function in the apparatus to be maintained. On the other hand, if a user has multiple apparatuses to be maintained with the function of receiving remote maintenance, it is troublesome to set a maintenance policy apparatus by apparatus. In particular, if the apparatuses to be maintained are of different types, it is difficult to share a maintenance policy.

SUMMARY OF THE INVENTION

Accordingly, it is a general object of the present invention to provide a maintenance mediation apparatus, a maintenance target apparatus maintenance method, and a maintenance system in which the above-described disadvantages are eliminated.

A more specific object of the present invention is to provide a maintenance mediation apparatus, a maintenance target apparatus maintenance method, and a maintenance system that can remotely maintain multiple apparatuses to be maintained in accordance with a consistent maintenance policy through a network.

Another more specific object of the present invention is to provide a computer-readable recording medium on which a program for causing a computer to execute such a maintenance target apparatus maintenance method is recorded.

One or more of the above objects of the present invention are achieved by a maintenance mediation apparatus mediating maintenance operation instruction information in which a maintenance center gives an instruction for a maintenance operation to a corresponding one of maintenance target apparatuses connected to the maintenance center through a network, the maintenance mediation apparatus including: a maintenance operation instruction information reception part configured to receive the maintenance operation instruction information from the maintenance center; a maintenance policy database storing a maintenance policy defining at least one of whether to authorize the maintenance operation on the corresponding one of the maintenance target apparatuses by the maintenance center and whether to authorize transmission of each item of usage condition information of the corresponding one of the maintenance target apparatuses to the maintenance center; a maintenance operation determination part configured to determine whether to execute the maintenance operation referring to the maintenance policy database; and a maintenance operation instruction information transmission part configured to transmit the maintenance operation instruction information received by the maintenance operation instruction information reception part to the corresponding one of the maintenance target apparatuses based on a result of the determination by the maintenance operation determination part.

One or more of the above objects of the present invention are achieved by a maintenance target apparatus maintenance method that maintains a corresponding one of maintenance target apparatuses by mediating maintenance operation instruction information in which a maintenance center gives an instruction for a maintenance operation to the corresponding one of maintenance target apparatuses connected to the maintenance center through a network, the maintenance target apparatus maintenance method including the steps of: (a) receiving the maintenance operation instruction information from the maintenance center; (b) referring to a maintenance policy database storing a maintenance policy defining at least one of whether to authorize the maintenance operation on the corresponding one of the maintenance target apparatuses by the maintenance center and whether to authorize transmission of each item of usage condition information of the corresponding one of the maintenance target apparatuses to the maintenance center; (c) determining whether to execute the maintenance operation referring to the maintenance policy; and (d) transmitting the maintenance operation instruction information received by step (a) to the corresponding one of the maintenance target apparatuses based on a result of the determination by step (c).

One or more of the above objects of the present invention are achieved by a computer-readable recording medium on which a program for causing a computer to execute a maintenance target apparatus maintenance method is recorded, the maintenance target apparatus maintenance method maintaining a corresponding one of maintenance target apparatuses by mediating maintenance operation instruction information in which a maintenance center gives an instruction for a maintenance operation to the corresponding one of maintenance target apparatuses connected to the maintenance center through a network, the maintenance target apparatus maintenance method including the steps of: (a) receiving the maintenance operation instruction information from the maintenance center; (b) referring to a maintenance policy database storing a maintenance policy defining at least one of whether to authorize the maintenance operation on the corresponding one of the maintenance target apparatuses by the maintenance center and whether to authorize transmission of each item of usage condition information of the corresponding one of the maintenance target apparatuses to the maintenance center; (c) determining whether to execute the maintenance operation referring to the maintenance policy; and (d) transmitting the maintenance operation instruction information received by step (a) to the corresponding one of the maintenance target apparatuses based on a result of the determination by step (c).

One or more of the above objects of the present invention are achieved by a maintenance system in which a maintenance mediation apparatus mediates maintenance operation instruction information in which a maintenance center gives an instruction for a maintenance operation to a corresponding one of maintenance target apparatuses connected to the maintenance center through a network, wherein: the maintenance center includes a maintenance operation instruction information transmission part configured to transmit the maintenance operation instruction information to the maintenance mediation apparatus; and the maintenance intermediation apparatus includes: a maintenance policy database storing a maintenance policy defining at least one of whether to authorize the maintenance operation on the corresponding one of the maintenance target apparatuses by the maintenance center and whether to authorize transmission of each item of usage condition information of the corresponding one of the maintenance target apparatuses to the maintenance center; a maintenance operation determination part configured to determine whether to execute the maintenance operation referring to the maintenance policy database; and a maintenance operation instruction information transmission part configured to transmit the maintenance operation instruction information received from the maintenance center to the corresponding one of the maintenance target apparatuses based on a result of the determination by the maintenance operation determination part.

According to one aspect of the present invention, a maintenance mediation apparatus, a maintenance target apparatus maintenance method, and a maintenance system that can remotely maintain multiple maintenance target apparatuses in accordance with a consistent maintenance policy through a network can be provided. Further, a computer-readable recording medium on which a program for causing a computer to execute such a maintenance target apparatus maintenance method is recorded can be provided.

BRIEF DESCRIPTION OF THE DRAWINGS

Other objects, features and advantages of the present invention will become more apparent from the following detailed description when read in conjunction with the accompanying drawings, in which:

FIGS. 3A and 3B show a maintenance information provision policy and a maintenance operation authorization policy, respectively, according to the embodiment of the present invention;

FIGS. 4A and 4B show a setting screen of the maintenance information provision policy and a setting screen of the maintenance operation authorization policy, respectively, according to the embodiment of the present invention;

FIG. 6 shows XML data generated based on a maintenance policy according to the embodiment of the present invention;

FIG. 7 is a sequence diagram showing an operational sequence in the case of an administrator registering a maintenance target apparatus in the maintenance mediation apparatus according to the embodiment of the present invention;

FIG. 9 is a sequence diagram showing an operational sequence in the case of the maintenance mediation apparatus obtaining periodically provided usage condition information defined by the maintenance policy from the maintenance target apparatus with timing set in an automatic provision interval and transmitting the obtained periodically provided usage condition information to a remote maintenance center according to the embodiment of the present invention;

FIG. 10 shows pseudo code of a SOAP interface with which a maintenance part transmits the periodically provided usage condition information to the remote maintenance center with timing defined by the automatic provision interval according to the embodiment of the present invention;

FIG. 11 is a sequence diagram showing an operational sequence in the case of the remote maintenance center performing a maintenance operation within a range authorized by the maintenance policy according to the embodiment of the present invention;

FIG. 12 shows a SOAP interface in the case of issuing an instruction to execute a maintenance operation according to the embodiment of the present invention;

FIGS. 13A and 13B show pseudo code of a SOAP interface in maintenance policy determination performed by a policy determination part according to the embodiment of the present invention; and FIG. 14 shows pseudo code of a SOAP interface in the case of a maintenance operation execution part executing a maintenance operation according to the embodiment of the present invention.

DETAILED DESCRIPTION OF THE PREFERRED EMBODIMENTS

A description is given below, with reference to the accompanying drawings, of an embodiment of the present invention.

In this embodiment, an apparatus to be maintained, which is an object (target) of maintenance, may be any apparatus that is connected to a network and maintained. Hereinafter, the apparatus to be maintained may be referred to as "maintenance target apparatus." For instance, the maintenance target apparatus may be a copier, a facsimile machine, a printer, a scanner, a digital multifunction product (hereinafter referred to as "MFP") that has the functions of a copier, facsimile machine, printer, and scanner and is capable of forming an image, or an electronic document management server.

Figure 1:
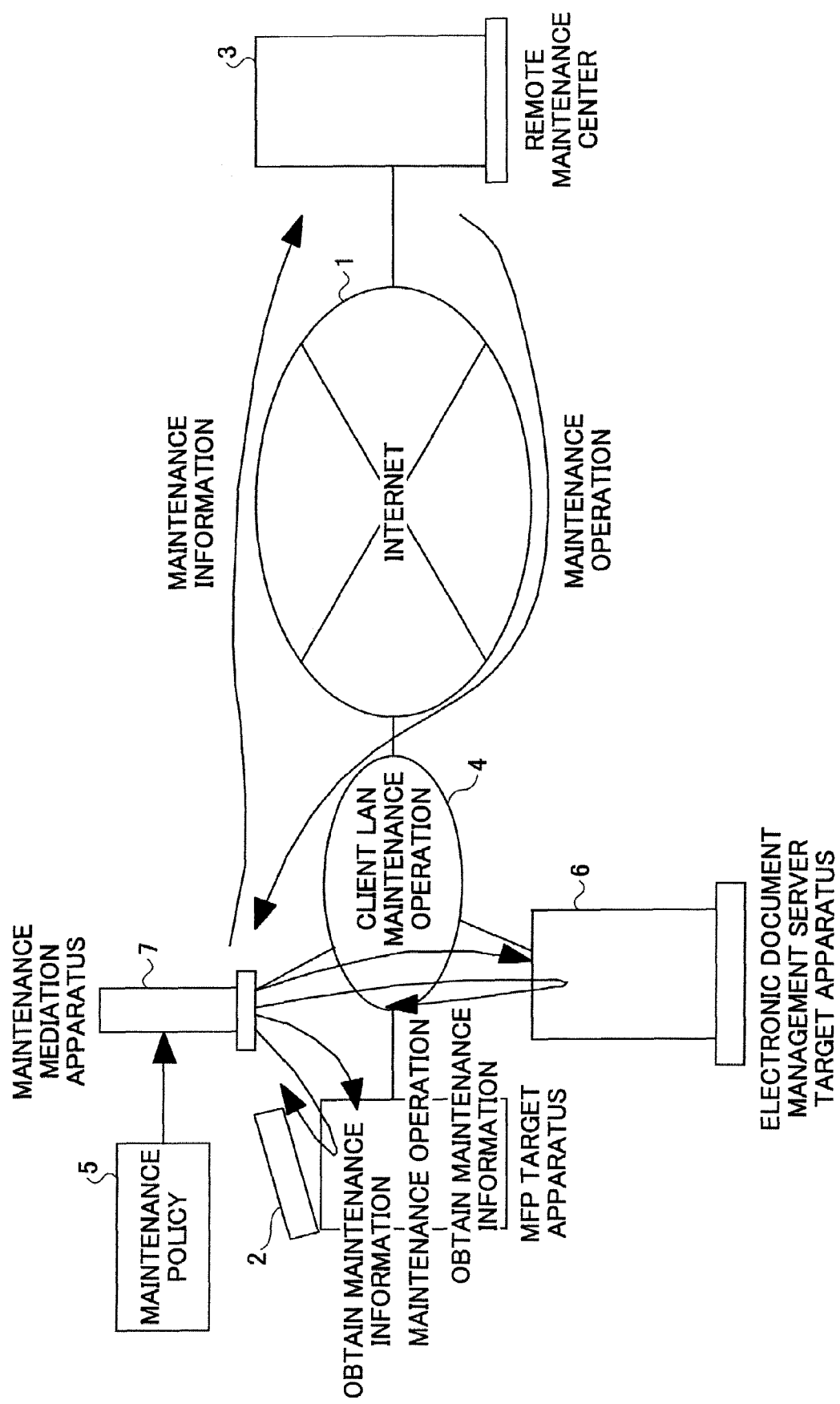
FIG. 1 is a schematic diagram showing a maintenance system that remotely maintains maintenance target apparatuses according to an embodiment of the present invention.

FIG. 1 is a schematic diagram showing a maintenance system that remotely maintains maintenance target apparatuses (hereinafter referred to as "remote maintenance system") according to this embodiment. In this remote maintenance system, a maintenance center 3 that remotely maintains maintenance target apparatuses (hereinafter referred to as "remote maintenance center 3") is connected to a maintenance mediation apparatus 7 through an external network 1 and an internal network 4. The maintenance mediation apparatus 7 is connected to an MFP 2 and an electronic document management server 6, which are maintenance target apparatuses, through the internal network 4. In this embodiment, the MFP 2 and the electronic document management server 6 may be collectively referred to as a maintenance target apparatus because there is no need to make a distinction between the MFP 2 and the electronic document management server 6.

The remote maintenance center 3 maintains the MFP 2 and the electronic document management server 6 in accordance with a maintenance policy 5 set in the maintenance mediation apparatus 7. The maintenance policy 5 defines the maintenance policy of a maintenance target apparatus determined by a user.

The external network 1 may be the Internet, and the internal network 4 may be a LAN (Local Area Network) or a WAN (Wide Area Network). In FIG. 1, the maintenance mediation apparatus 7 and the maintenance target apparatus are separate bodies. Alternatively, a predetermined maintenance target apparatus may have the function of the maintenance mediation apparatus 7.

An overview is given of maintenance work. According to this embodiment, a maintenance target apparatus used by a user is maintained in accordance with the maintenance policy determined by the user. The maintenance target apparatus has usage condition information that is information on the condition of usage of the maintenance target apparatus, such as the amount of residual toner and the number of copies made. The usage condition information includes information on maintenance, such as the machine number and the IP address of the maintenance target apparatus. Accordingly, the usage condition information is hereinafter referred to as "maintenance information."

The maintenance policy 5, which is described in detail below, includes a part defining what maintenance information to transmit and when to transmit the maintenance information (a maintenance information provision policy) and a part defining what maintenance operation from the remote maintenance center 3 is authorized (a maintenance operation authorization policy). The maintenance information provision policy defines the contents of maintenance information to be provided to the remote maintenance center 3 and the frequency of the provision. For instance, the amount of residual toner and the cumulative number of copies made may be provided once every thirty minutes as maintenance information, while the log of facsimile transmission is not to be provided. The maintenance operation authorization policy defines the contents of maintenance that the maintenance mediation apparatus 7 can provide to a maintenance target apparatus. For instance, it may be set as the maintenance operation authorization policy that resetting a copy counter is authorized but rebooting is not authorized.

A maintenance target apparatus is preregistered with the maintenance mediation apparatus 7. When the maintenance mediation apparatus 7 receives a maintenance operation request from the remote maintenance center 3, the maintenance mediation apparatus 7 determines whether to authorize the maintenance operation in accordance with the maintenance policy 5. If the maintenance operation is authorized, the maintenance mediation apparatus 7 performs the maintenance operation on the preregistered maintenance target apparatus. Further, the maintenance mediation apparatus 7 collects maintenance information from each registered maintenance target apparatus in accordance with the maintenance policy 5, and transmits the collected maintenance information to the remote maintenance center 3.

[Functional Configuration of Maintenance Mediation Apparatus 7]

Figure 2:
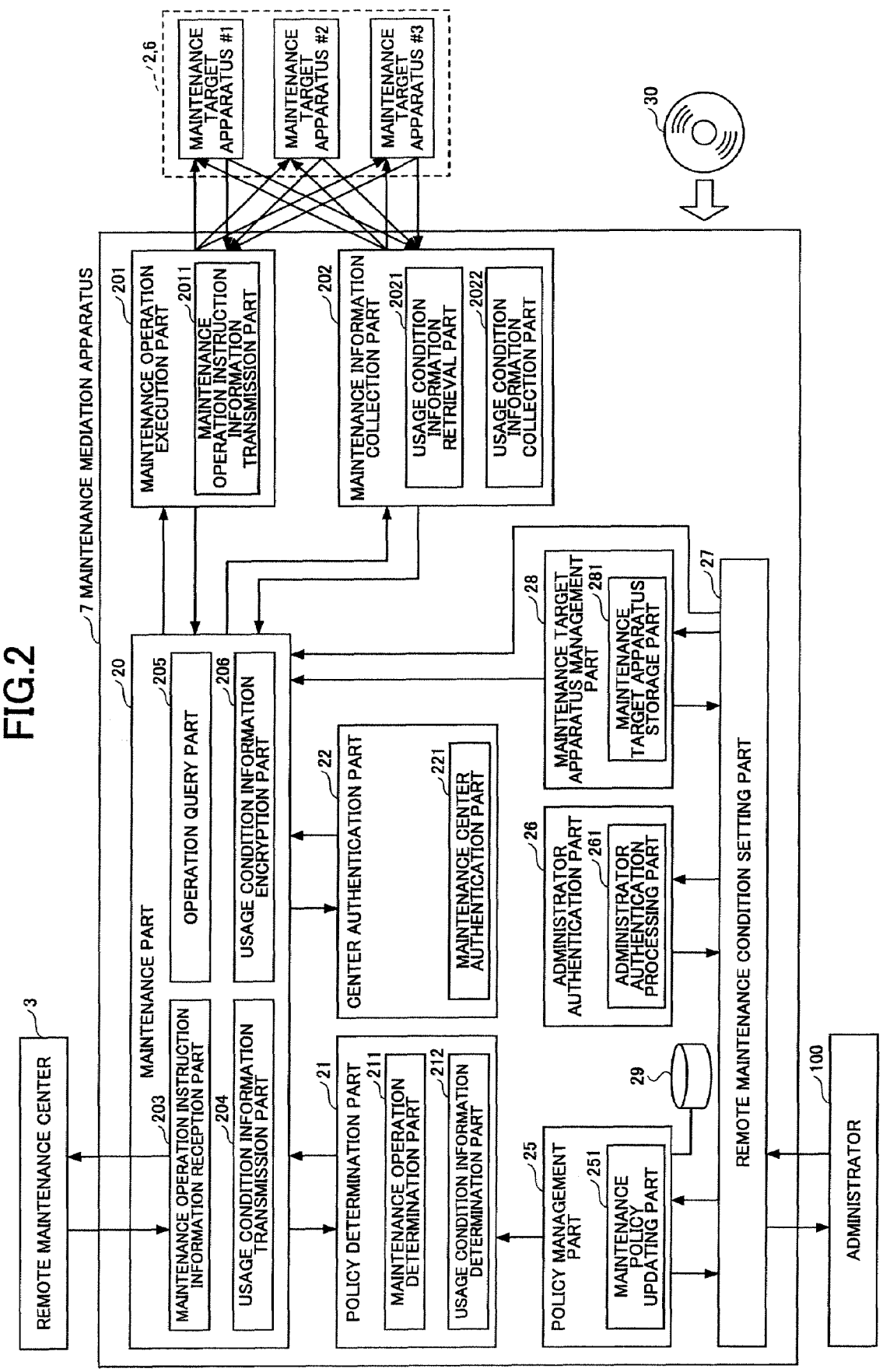
FIG. 2 is a functional block diagram showing a maintenance mediation apparatus according to the embodiment of the present invention.

Next, a description is given, with reference to FIG. 2, of functions of the maintenance mediation apparatus 7. The maintenance mediation apparatus 7 includes a maintenance part 20, a maintenance operation execution part 201, a maintenance information collection part 202, a policy determination part 21, a center authentication part 22, a policy management part 25, an administrator authentication part 26, a maintenance target apparatus management part 28, and a remote maintenance condition setting part 27.

The maintenance mediation apparatus 7 is formed of a computer so as to include, for instance, a CPU, an input/output device, a drive unit, a communications device, a primary storage unit, and a storage unit (hard disk), which are interconnected through a bus. A maintenance program providing a remote maintenance function is recorded in the storage unit. The CPU executes the maintenance program so that the computer provides the functions of the maintenance mediation apparatus 7 described below as the maintenance mediation apparatus 7.

The remote maintenance condition setting part 27 provides the interface between an administrator 100 and the maintenance mediation apparatus 7. In accordance with the contents of input from the administrator 100, the remote maintenance condition setting part 27 outputs the contents to other functions. Further, the remote maintenance condition setting part 27 generates XML data from a maintenance policy input by the administrator 100, and outputs the generated XML data to the policy management part 25.

The administrator authentication part 26 includes an administrator authentication processing part 261. The administrator authentication part 26 authenticates the administrator 100 based on an administrator ID and a password input by the administrator 100 and received from the remote maintenance condition setting part 27.

The policy management part 25 includes a maintenance policy updating part 251. The policy management part 25 calls a currently set maintenance policy (current maintenance policy), and updates the maintenance policy 5 with a new maintenance policy set by the administrator 100. The policy management part 25 includes a maintenance policy database 29 storing a maintenance policy.

The maintenance target apparatus management part 28 manages the maintenance target apparatus (2, 6) currently registered as an object of maintenance. The maintenance target apparatus management part 28 includes a maintenance target apparatus storage part 281 storing a list of currently registered maintenance target apparatuses. The maintenance target apparatus management part 28 reads out the list of currently registered maintenance target apparatuses. Further, the maintenance target apparatus management part 28 adds a new maintenance target apparatus to the list or deletes a registered maintenance target apparatus from the list.

The maintenance part 20 includes a maintenance operation instruction information reception part 203, a usage condition information transmission part 204, an operation query part 205, and a usage condition information encryption part 206. The maintenance operation instruction information reception part 203 receives maintenance operation instruction information from the remote maintenance center 3. The usage condition information transmission part 204 transmits maintenance information requested by the remote maintenance center 3 to the remote maintenance center 3. The operation query part 205 periodically queries the remote maintenance center 3 about an instruction for a maintenance operation. Even when a firewall prevents the remote maintenance center 3 from giving an instruction for a maintenance operation, the maintenance operation is performed by the operation query part 205.

The maintenance operation execution part 201 includes a maintenance operation instruction information transmission part 2011. The maintenance operation execution part 201 transmits information on an instruction for a maintenance operation specified by the remote maintenance center 3, such as machine rebooting or HDD formatting, to the maintenance target apparatus (2, 6).

The maintenance information collection part 202 includes a usage condition information retrieval part 2021 and a usage condition information collection part 2022. The usage condition information retrieval part 2021 obtains or retrieves maintenance information selected by the policy determination part 21 from the maintenance target apparatus (2, 6). The usage condition information collection part collects usage condition information provided periodically from each maintenance target apparatus (2, 6) at time intervals determined by the maintenance policy 5.

The policy determination part 21 includes a maintenance operation determination part 211 and a usage condition information determination part 212. The maintenance operation determination part 211 determines whether a maintenance operation commanded by the remote maintenance center 3 is authorized by the maintenance policy 5. The usage condition information determination part 212 determines whether it is authorized by the maintenance policy 5 to transmit maintenance information whose transmission is requested by the remote maintenance center 3. Accordingly, the policy determination part 21 can determine with respect to each maintenance target apparatus (2, 6) whether a maintenance operation or transmission of maintenance information commanded by the remote maintenance center 3 is authorized.

The center authentication part 22 includes a maintenance center authentication part 221. The center authentication part 22 determines, using a predetermined authentication method, whether the remote maintenance center 3 is a remote maintenance center with which a maintenance contract is signed.

A CD-ROM 30 is a storage medium storing a maintenance program, of which an expatiation is given below.

[Maintenance Policy]

An expatiation is given of the maintenance policy 5. As described above, the maintenance policy 5 includes the maintenance information provision policy and the maintenance operation authorization policy. The maintenance information provision policy defines, in correspondence to each type of maintenance information, authorization/prohibition of provision of the maintenance information to the remote maintenance center 3 and timing of the provision. The maintenance operation authorization policy defines, in correspondence to each maintenance operation, authorization/prohibition of the maintenance operation by the remote maintenance center 3.

FIG. 3A shows an example of the maintenance information provision policy. FIG. 3B shows an example of the maintenance operation authorization policy. The maintenance information provision policy includes items of automatic provision interval, unit, types of periodically provided usage condition information, and types of maintenance information. The item of "automatic provision interval" defines timing of automatic provision of maintenance information. The item of "unit" defines the unit of the timing set in the item of "automatic provision interval," and is expressed by, for instance, hour, minute, or second. The item of "types of periodically provided usage condition information" is maintenance information automatically provided to the remote maintenance center 3. For instance, in the case of FIG. 3A, a machine number, a copy counter (value), and the amount of residual toner are set as types of periodically provided usage condition information. No type may be optionally set in the item of types of periodically provided usage condition information.

The types of maintenance information include a machine number, an IP (Internet Protocol) address, a MAC (Media Access Control) address, a firmware version, a copy counter (value), and the amount of residual toner. The machine number is a number identifying an MFP (maintenance target apparatus). The IP address makes it possible to perform communications from an external network. The MAC address makes it possible to identify an address in a LAN. A firmware version represents the version of firmware installed in the MFP. The copy counter is the number of copies made from the last maintenance or after delivery of the MFP. The amount of residual toner is the remaining amount of toner. Authorization or prohibition may be set for each type of maintenance information. Maintenance information of a type set as "authorized" is transmitted to the remote maintenance center 3 by the instruction of the remote maintenance center 3.

The maintenance operation authorization policy includes maintenance operations such as machine rebooting, HDD formatting, address book initialization, administrator password initialization, and maintenance information retrieval. Authorization or prohibition may be set for each maintenance operation. A maintenance operation set as "authorized" can be performed by the instruction of the remote maintenance center 3.

The maintenance policy 5 is set by an authorized administrator. The administrator sets each item using, for instance, a keyboard and/or a mouse of the maintenance mediation apparatus 7. FIG. 4A shows a setting screen of the maintenance information provision policy. FIG. 4B shows a setting screen of the maintenance operation authorization policy. On the setting screens of the maintenance information provision policy and the maintenance operation authorization policy, numeric values can be entered from a keyboard, and an item of AUTHORIZE or PROHIBIT can be selected with a mouse. A selected one of AUTHORIZE or PROHIBIT is framed. The automatic provision interval and the types of periodically provided usage condition information are entered with numeric values from the keyboard. When the administrator touches an end button, the setting operation ends.

Figure 5B:
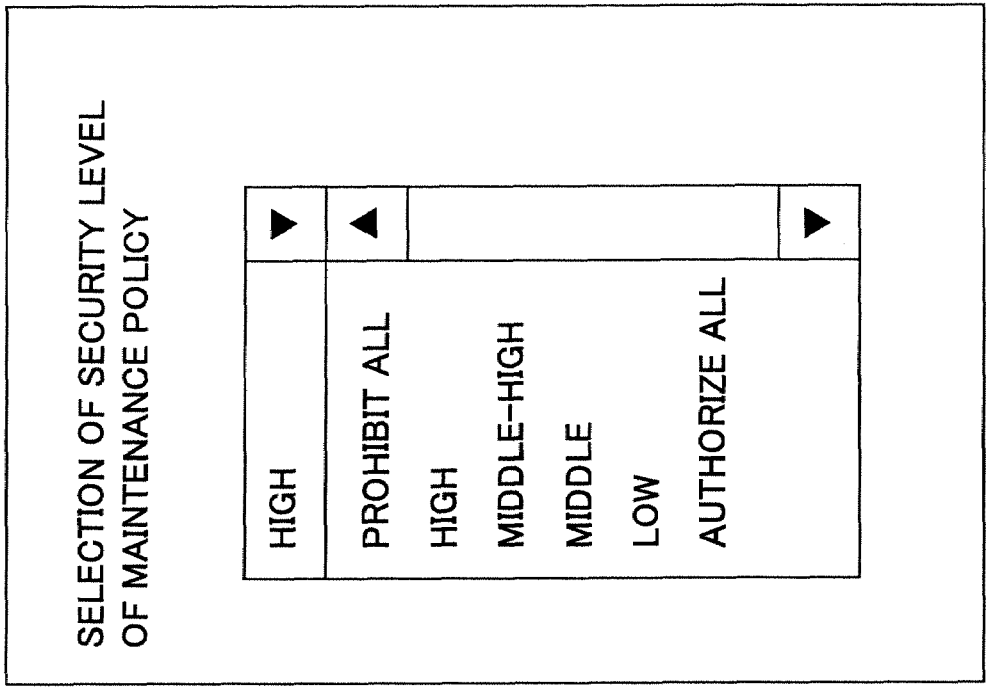
FIGS. 5A and 5B show a maintenance policy setting screen of a slider type and a maintenance policy setting screen of a pull-down selection type, respectively, according to the embodiment of the present invention.
Figure 5A:
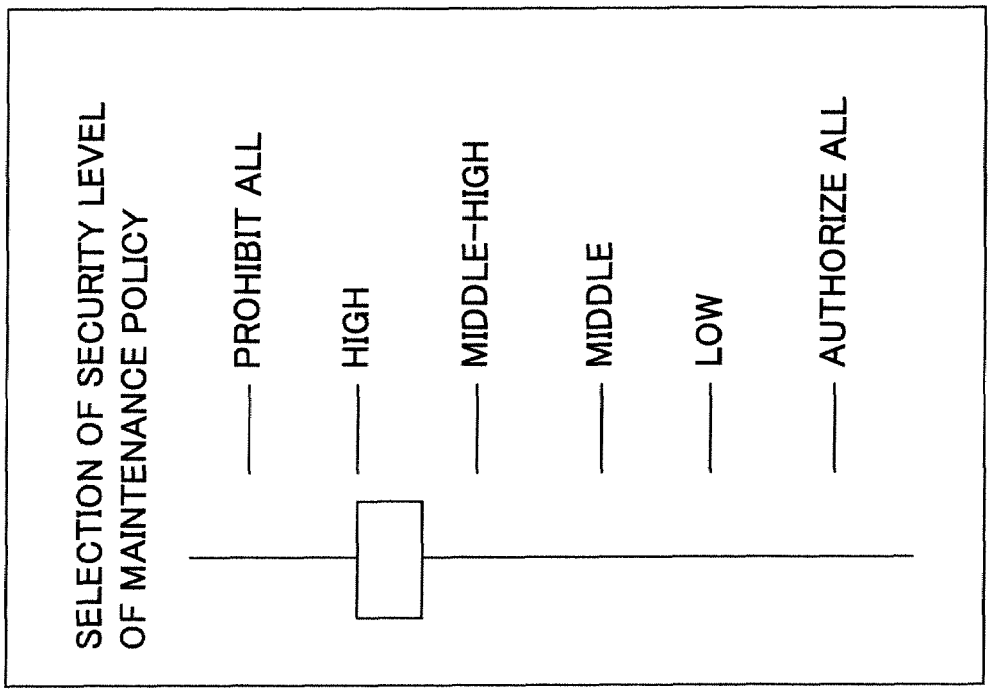

Instead of manipulating each item individually as shown in FIGS. 4A and 4B, the items of a maintenance policy may be set in a single operation. FIG. 5A shows a maintenance policy setting screen of a slider type. FIG. 5B shows a maintenance policy setting screen of a pull-down selection type. In the setting screens of FIGS. 5A and 5B, the security level of a maintenance policy can be selected from PROHIBIT ALL, HIGH, MIDDLE-HIGH, MIDDLE, LOW, and AUTHORIZE ALL. In correspondence to each security level, a combination of the AUTHORIZE/PROHIBIT settings of maintenance policy items, the types of periodically provided usage condition information, and the automatic provision interval are determined. Accordingly, when the administrator selects one of the security levels, each item of the maintenance policy is automatically set. The correspondence between each security level and the AUTHORIZE/PROHIBIT settings of maintenance policy items may be determined by the administrator.

A maintenance policy input by the administrator is generated as data in the XML format (XML data). FIG. 6 shows XML data generated based on a maintenance policy input from the screen of FIG. 4A, 4B, 5A, or 5B. The remote maintenance condition setting part 27 generates XML data as shown in FIG. 6 from the setting contents of the input maintenance policy. The XML data is output to the policy management part 25. The policy management part 25 stores the XML data in the maintenance policy database 29 as a file. Storing the maintenance policy in the XML data format makes it easy to use a SOAP (Simple Object Access Protocol) message, and also makes it possible to provide remote maintenance irrespective of the OS of a maintenance target apparatus.

The maintenance policy 5 may be input from a terminal connected to the internal network 4 or the external network (Internet) 1 instead of being input directly from the maintenance mediation apparatus 7.

Alternatively, for instance, the maintenance policy 5 may also be prepared by XML data and set in the maintenance mediation apparatus 7 by the administrator instead of being input from the maintenance mediation apparatus 7 or a terminal. The administrator stores a maintenance policy written in XML in a recording medium such as an FD or a smart card as a file. In setting the maintenance policy 5 in the maintenance mediation apparatus 7, the FD or smart card on which the XML data is recorded is set in the maintenance mediation apparatus 7 instead of inputting each item (AUTHORIZE/PROHIBIT) of the maintenance policy 5. The remote maintenance condition setting part 27 reads the XML file from the FD or smart card set in the maintenance mediation apparatus 7, and stores the XML file in the maintenance policy database 29 as the maintenance policy 5.

Recording a maintenance policy converted into or written in XML in a recording medium and updating the maintenance policy database 29 from the recording medium makes it possible to omit inputting from a network-compliant apparatus.

In the case of setting the maintenance policy 5 in the maintenance mediation apparatus 7 by giving the maintenance policy 5 recorded in the FD to another person, the maintenance policy 5 (XML data) of the FD may be altered dishonestly. In order to prevent this, it is suitable, for instance, that the administrator provide an electronic signature to the XML data. In reading the XML data from the FD or smart card set in the maintenance mediation apparatus 7 and setting the XML data in the policy management part 25 as the maintenance policy 5, the remote maintenance condition setting part 27 refers to the provided electronic signature, and checks the validity of the XML data. If the validity of the XML data is confirmed, the remote maintenance condition setting part 27 sets the XML data in the policy management part 25.

As a method of providing an electronic signature to an XML file, for instance, an electronic signing method suited to the XML structure, such as XML signature (IETF RFC 3275) may be employed. Alternatively, an electronic signing method such as PKCS (Public Key Cryptography Standards) #7 may be employed, treating the XML file simply as data.

The maintenance policy 5 may be retained as a single XML data item irrespective of the types of maintenance target apparatuses, such as the MFP 2 and the electronic document management server 6. Alternatively, the maintenance policy 5 may also be provided in the maintenance mediation apparatus 7 for each type of maintenance target apparatus, for instance, for the MFP 2 and for the electronic document management server 6.

[Communications Interface]

Next, an expatiation is given below, based on the maintenance policy 5 and the above-described configuration, of maintenance of a maintenance target apparatus by the maintenance mediation apparatus 7.

Multiple communications are performed between the remote maintenance center 3 and the maintenance mediation apparatus 7. For instance, not only maintenance information is transmitted, but also it is determined whether a maintenance target apparatus is the one with which a maintenance contract is signed and authentication is performed so as to determine whether the connected remote maintenance center 3 is a right one. In order to perform such communications, it is suitable to employ SOAP on HTTP.

SOAP makes it possible to access an object (data) of a computer on a network, using a message written in XML.

SOAP makes it possible to access data without dependence on an OS or a program language. Accordingly, SOAP makes it possible to process data without being affected by the difference in architecture between various maintenance target apparatuses and computers. Further, SOAP also makes it possible to mount the function of the maintenance mediation apparatus 7 directly in a maintenance target apparatus. In the following description, a maintenance operation by the maintenance mediation apparatus 7 is performed with a SOAP message.

[Registration of Maintenance Target Apparatus]

A maintenance target apparatus is set in the maintenance mediation apparatus 7 from the operations panel or keyboard of the maintenance mediation apparatus 7 or through the network.

FIG. 7 is a sequence diagram showing an operational sequence in the case of the administrator 100 registering a maintenance target apparatus in the maintenance mediation apparatus 7. In step S51 of FIG. 7, in order to authenticate the administrator 100, for instance, a SOAP interface "authenticateAdmin(String name, String password): String session" is called, and an administrator ID and a password are stored in "name" and "password," respectively. When the administrator ID and the password are stored, in step S52, the remote maintenance condition setting part 27 outputs the administrator ID and the password to the administrator authentication part 26. In step S53, the administrator authentication part 26 authenticates the administrator 100 based on the matching of the administrator ID and the password. If there is the matching of the administrator ID and the password, in step S54, the administrator authentication part 26 outputs a signal indicating that the administrator 100 is authenticated to the remote maintenance condition setting part 27. The signal indicating that the administrator 100 is authenticated is stored in a return value session.

When the administrator 100 is authenticated, in step S55, the remote maintenance condition setting part 27 requests a list of maintenance target apparatuses (a maintenance target apparatus list) from the maintenance target apparatus management part 28. For instance, a SOAP interface "getRegisteredTargetSystems(String session): TargetInfo[ ] targets" is called, and a list of currently registered maintenance target apparatuses is obtained in an array. The array is defined in TargetInfo[ ] as follows:

```
TargetInfo type {
    String targetId;        //maintenance target
apparatus identification ID
    String ipAddress;       //maintenance target
apparatus IP address
    String systemType;      //maintenance target
apparatus system type (MFP, document management
system, etc.)
}.
```

In step S56, the maintenance target apparatus management part 28 reads out the maintenance target apparatus list. Then, in step S57, the maintenance target apparatus management part 28 stores the identification IDs, etc., of the already registered maintenance target apparatuses in the corresponding elements of the array as follows:

```
targets [0] .targetId = "23094203-777635";
targets [0] .ipAddress = "192.168.12.234";
```

-continued

```
targets [0] .systemType = "Digital Copier";
targets [1] .targetId = "23094205-847257";
. . . ,
``` and outputs the maintenance target apparatus list to the remote maintenance condition setting part 27. In step S58, the remote maintenance condition setting part 27 displays the maintenance target apparatus list on the operations panel or the like, and in step S59, the administrator 100 inputs a new maintenance target apparatus.

Next, in step S60, the remote maintenance condition setting part 27 requests the maintenance target apparatus management part 28 to register the new maintenance target apparatus. For instance, in a SOAP interface "registerNewTargetSystem(String session, TargetInfo newTarget): void;", the new maintenance target apparatus is stored in "newTarget" using the same TargetInfo array as that at the time of obtaining the list.

In step S61, the maintenance target apparatus management part 28 registers the new maintenance target apparatus, and in step S62, outputs the registration result to the remote maintenance condition setting part 27. In step S63, the remote maintenance condition setting part 27 displays the registration result on the operations panel or the like.

In the case of removing a registered maintenance target apparatus from maintenance targets, the registered maintenance target apparatus is deleted from the maintenance target apparatus list. For instance, a SOAP interface such as "deleteTargetSystem(String session, String targetId) is used.

[Setting of Maintenance Policy]

A description is given of an operation in setting a maintenance policy. The maintenance policy defines authorization or prohibition of transmission of maintenance information and a maintenance operation. Therefore, preferably, the maintenance policy cannot be updated by a person other than the administrator managing the maintenance policy.

Figure 8:
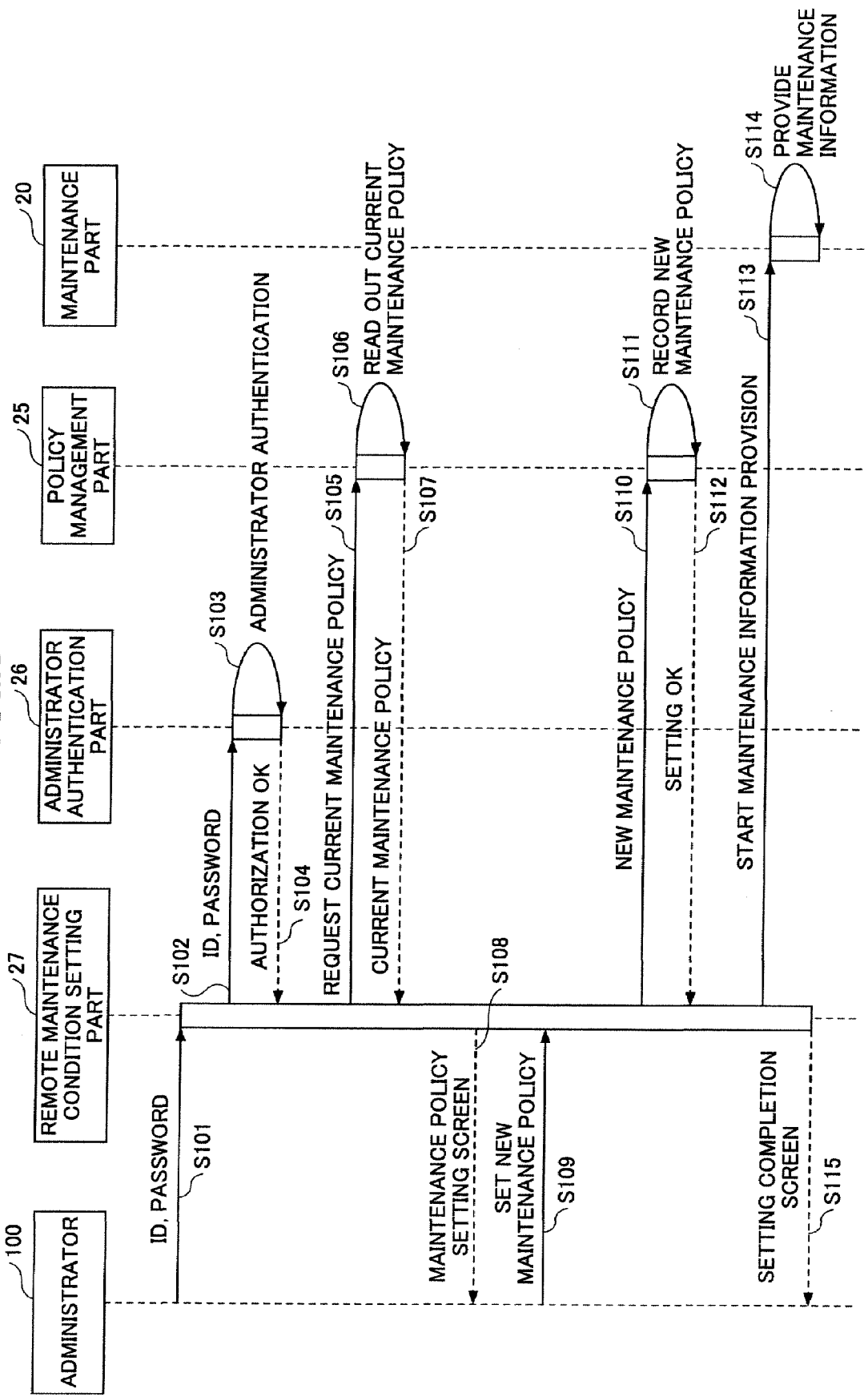
FIG. 8 is a sequence diagram showing an operational sequence in the case of the administrator setting the maintenance policy in the maintenance mediation apparatus according to the embodiment of the present invention.

FIG. 8 is a sequence diagram showing an operational sequence in the case of the administrator 100 setting the maintenance policy 5 in the maintenance mediation apparatus 7. In the case of setting the maintenance policy 5, in step S101, the administrator 100 enters an administrator ID and a password. For instance, a SOAP interface "authenticateAdmin(String name, String password): String session" is called, and the administrator ID and the password are stored in "name" and "password," respectively. When the administrator ID and the password are entered, in step S102, the remote maintenance condition setting part 27 outputs the administrator ID and the password to the administrator authentication part 26. In step S103, the administrator authentication part 26 authenticates the administrator 100 based on the matching of the administrator ID and the password. If there is the matching of the administrator ID and the password, in step S104, the administrator authentication part 26 outputs a signal indicating that the administrator 100 is authenticated to the remote maintenance condition setting part 27. The signal indicating that the administrator 100 is authenticated is stored in a return value session. Authenticating the administrator 100 makes it possible to prevent the maintenance policy database 29 from being updated by a person other than the administrator 100, such as a user.

When the administrator 100 is authenticated, in step S105, the remote maintenance condition setting part 27 requests a current maintenance policy from the policy management part 25. For instance, a SOAP interface "getCurrentRemoteMaintenancePolicy(String session): byte[ ] policy" is called. In step S106, the policy management part 25 reads out the current maintenance policy. Then, in step S107, the policy management part 25 stores the current maintenance policy in "policy," and outputs the current maintenance policy to the remote maintenance condition setting part 27. In step S108, the remote maintenance condition setting part 27 displays a maintenance policy setting screen on a display unit of the maintenance mediation apparatus 7, and displays the contents of the current maintenance policy on the maintenance policy setting screen. In step S109, the administrator 100 inputs a new maintenance policy, referring to the current maintenance policy displayed on the maintenance policy setting screen.

In step S110, the remote maintenance condition setting part 27 converts the new maintenance policy input by the administrator 100 into XML data, and outputs the XML data to the policy management part 25. For instance, a SOAP interface "setNewRemoteMaintenancePolicy(String session, byte[ ] policy): String error" is called by the remote maintenance condition setting part 27. The remote maintenance condition setting part 27 outputs the new maintenance policy stored in "Policy" to the policy management part 25. In step S111, the policy management part 25 replaces the current maintenance policy with the new maintenance policy. That is, the policy management part 25 updates the maintenance policy 5. Further, in step S112, the policy management part 25 stores a signal indicating completion of the updating of the maintenance policy 5 in "error," and outputs the signal to the remote maintenance condition setting part 27.

Next, in step S115, the remote maintenance condition setting part 27 displays a message indicating completion of the setting of the new maintenance policy on the maintenance policy setting screen. Further, in step S113, the remote maintenance condition setting part 27 outputs a signal indicating that the new maintenance policy is set to the maintenance part 20.

When the new maintenance policy is set, the automatic provision interval, which defines intervals at which maintenance information is provided periodically to the remote maintenance center 3, is changed. Accordingly, in step S114, the maintenance part 20 starts providing maintenance information based on the new maintenance policy. A detailed description is given below of provision of maintenance information.

Thus, the maintenance policy 5 is set based on the user's policy of maintenance. The administrator authentication method may be biometrics authentication using a fingerprint or PKI (Public Key Infrastructure)-based authentication using a smart card. The maintenance policy 5 determines a user's policy of maintenance of a maintenance target apparatus. Accordingly, the maintenance policy 5 is not set when a person other than the administrator 100 attempts to set the maintenance policy 5 or an attempt to set the maintenance policy 5 is made from the remote maintenance center 3.

[Periodic Provision of Maintenance Information]

A description is given of the operation of the remote maintenance center 3 obtaining maintenance information from a maintenance target apparatus through the maintenance mediation apparatus 7. The maintenance mediation apparatus 7 transmits periodically provided usage condition information to the remote maintenance center 3 with timing set in the automatic provision interval of the maintenance policy 5. This makes it possible for the remote maintenance center 3 to obtain the maintenance information of a maintenance target apparatus, such as the amount of residual toner and the cumulative number of copies made, and to give an instruction for remote maintenance in accordance with the maintenance information. The maintenance mediation apparatus 7 obtains the maintenance information of a maintenance target apparatus registered with the maintenance target apparatus management part 28 and transmits the maintenance information to the remote maintenance center 3 with timing set in the automatic provision interval of the maintenance policy 5.

Of the usage condition information, the maintenance policy 5 defines periodically provided usage condition information to be transmitted periodically to the remote maintenance center 3. Further, the maintenance policy 5 also defines its transmission timing (intervals). Accordingly, the maintenance mediation apparatus 7 can transmit part of the usage condition information without a request from the remote maintenance center 3.

FIG. 9 is a sequence diagram showing an operational sequence in the case of the maintenance mediation apparatus 7 obtaining periodically provided usage condition information defined by the maintenance policy 5 from a maintenance target apparatus with timing set in the automatic provision interval and transmitting the obtained periodically provided usage condition information to the remote maintenance center 3.

First, in step S201 of FIG. 9, the maintenance part 20 queries the policy determination part 21 about the types of periodically provided usage condition information. In step S202, receiving the query, the policy determination part 21 requests the policy management part 25 to obtain a current maintenance policy. In step S203, the policy management part 25 reads out the current maintenance policy, and in step S204, outputs the current maintenance policy to the policy determination part 21.

In step S205, obtaining the current maintenance policy, the policy determination part 21 extracts the maintenance information types recorded in the types of periodically provided usage condition information from the maintenance policy. Further, the policy determination part 21 extracts a time interval set in the automatic provision interval of the maintenance policy. In step S206, the policy determination part 21 outputs the extracted periodically provided usage condition information and automatic provision interval to the maintenance part 20.

Next, in step S207, the maintenance part 20 requests a list of maintenance target apparatuses registered with the maintenance target apparatus management part 28. In step S208, the maintenance target apparatus management part 28 reads out the list of registered maintenance target apparatuses (maintenance target apparatus list), and in step S209, transmits the list to the maintenance part 20. The maintenance target apparatuses registered with the list can be maintained based on the maintenance policy 5. Further, it is possible to prevent a maintenance target apparatus connected to the network but not registered with the list from being subjected to a maintenance operation or having its maintenance information retrieved. A SOAP interface that reads out the maintenance target apparatus list is the same as that of step S55 in the registration of a maintenance target apparatus.

In step S210, the maintenance part 20 outputs the periodically provided usage condition information and the maintenance target apparatus list to the maintenance information collection part 202. In step S211, the maintenance information collection part 202 refers to the maintenance target apparatus list and transmits a command to obtain and transmit the periodically provided usage condition information to a maintenance target apparatus #1 included in the list.

In step S212, the maintenance target apparatus #1 obtains its own maintenance information included in the periodically provided usage condition information, and transmits the obtained maintenance information to the maintenance information collection part 202. In steps S213 and S214, the maintenance information collection part 202 repeats the same operation as that in steps S211 and 212 with respect to the rest of the maintenance target apparatuses included in the list. As a result, the maintenance information collection part 202 collects maintenance information from each maintenance target apparatus included in the maintenance target apparatus list.

In step S220, the maintenance information collection part 202 outputs the maintenance information obtained from all the maintenance target apparatuses in the list to the maintenance part 20.

In step S221, the maintenance part 20 transmits the periodically provided usage condition information obtained from the maintenance information collection part 202 to the remote maintenance center 3 in accordance with the automatic provision interval. In step S222, receiving the periodically provided usage condition information, the remote maintenance center 3 transmits a signal indicating normal reception of the maintenance information to the maintenance part 20. Thereby, transmission of maintenance information from the maintenance mediation apparatus 7 to the remote maintenance center 3 ends. The maintenance mediation apparatus 7 repeats the operation shown in the sequence of FIG. 9 in accordance with the automatic provision interval.

Accordingly, the maintenance mediation apparatus 7 of this embodiment can obtain maintenance information authorized by the maintenance policy 5 from multiple maintenance target apparatuses and transmit the obtained maintenance information to the remote maintenance center 3. The automatic provision interval may be extracted only when the maintenance policy 5 is updated.

FIG. 10 shows pseudo code of a SOAP interface with which the maintenance part 20 transmits periodically provided usage condition information to the remote maintenance center 3 with timing defined by the automatic provision interval of the maintenance policy 5. Receiving a signal indicating a new maintenance policy has been set, the maintenance part 20 starts, for instance, the operation of FIG. 10.

First, the maintenance part 20 calls a SOAP interface "AutoProvision." The policy determination part 21 requests the policy management part 25 to obtain a maintenance policy. The policy management part 25 reads a maintenance policy file (XML data) from the maintenance policy database 29, and transmits the maintenance policy file to the policy determination part 21. Next, in the XML data described in FIG. 8, the policy determination part 21 extracts the automatic provision interval of the maintenance policy from an <Interval> element in an <AutoProvision> element below an <InfoProvisionPolicy> element.

Next, the policy determination part 21 obtains a list of information types enumerated below an <InfoList> element. Thereby, the policy determination part 21 obtains the automatic provision interval with which maintenance information is provided and the types of periodically provided usage condition information.

Once the types of periodically provided usage condition information are obtained, the maintenance part 20 obtains a list of maintenance target apparatuses, and obtains the periodically provided usage condition information maintenance target apparatus by maintenance target apparatus. Obtaining the periodically provided usage condition information, the maintenance part 20 calls a below-described SOAP interface "sendMaintenanceInfo" provided by the remote maintenance center 3 side, and transmits the obtained maintenance information to the remote maintenance center 3. Transmission of the maintenance information after every automatic provision interval is repeated until the maintenance policy is updated by the administrator.

A description is given of the SOAP interface "sendMaintenanceInfo." The maintenance mediation apparatus 7 transmits maintenance information to the remote maintenance center 3 with "sendMaintenanceInfo." The SOAP interface "sendMaintenanceInfo" includes parameters as follows:

sendMaintenanceInfo(byte[ ] random, byte[ ] authCode, String proxyId, MaintenanceInfo[ ] infoList): String error, where "random" and "authCode" are authentication information for authenticating a maintenance target apparatus, and "proxyId" is the identification information of the maintenance mediation apparatus 7. Further, "MaintenanceInfo[ ]" is defined as follows:

```
MaintenanceInfo type {
    String targetId;
    Parameter[ ] params;
}.
```

That is, in "infoList," the maintenance information is stored in "params" "targetId" by "targetId" as follows:
infoList[0].targetId="23094203-777635";
infoList[0].params[0].name="Machine Number";
infoList[0].params[0].value="23094203-777635";
infoList[0].params[1].name="Firmware Versions";
infoList[0].params[1].value="OS: 5.05, Main: 2.00, Sub: 1.01";
infoList[1].targetId="23094205-847257";
infoList[1].params[0].name="Machine Number"; . . . .

Communicating with the remote maintenance center 3 using the SOAP interface provided by the remote maintenance center 3 side and called by the maintenance mediation apparatus 7 makes it possible for the remote maintenance center 3 to receive the maintenance information of a maintenance target apparatus connected to the internal network 4.

It is suitable that these SOAP messages be communicated under the HTTP protocol on SSL (HTTPS) in order to prevent alteration and interception of a maintenance operation and maintenance information.

In the operation shown in the sequence of FIG. 9, the operation starts with transmission of maintenance information in accordance with the automatic provision interval by the maintenance mediation apparatus 7. Accordingly, the remote maintenance center 3 is not authenticated. However, the remote maintenance center 3 may be authenticated in order to prevent maintenance information from being transmitted to a computer different from the remote maintenance center 3.

Alternatively, instead of performing authentication, maintenance information that can be decoded only in the remote maintenance center 3 may be encrypted with a temporary key (using a high-speed encryption algorithm such as DES [Data Encryption Standard]) and transmitted, and the temporary key used for the encryption may be encrypted with the public key of the remote maintenance center 3 (using a public key encryption algorithm such as RSA) and transmitted with the maintenance information. As a result, the remote maintenance center 3 can obtain the temporary key by decoding using a secret key that the remote maintenance center 3 itself possesses and decode the maintenance information. It is possible to prevent disclosure of maintenance information by encrypting the maintenance information.

[Maintenance Operation by Remote Maintenance Center]

Next, a description is given of the remote maintenance center 3 performing a maintenance operation on a maintenance target apparatus through the maintenance mediation apparatus 7. FIG. 11 is a sequence diagram showing an operational sequence in the case of the remote maintenance center 3 performing a maintenance operation within a range authorized by the maintenance policy 5.

First, in step S301 of FIG. 11, the remote maintenance center 3 issues a request for authentication to the maintenance part 20 of the maintenance mediation apparatus 7. Challenge-response is used for authentication. A description is given separately of the case where communications from the external network 1 to the internal network 4 are blocked by a firewall.

In step S302, the maintenance part 20 requests a challenge from the center authentication part. In the case of requesting a challenge, a SOAP interface "getChallenge( ): byte[ ] challenge" is called, for instance.

In step S303, receiving the request for a challenge, the center authentication part 22 generates a challenge and stores the challenge in a return value "challenge." Then, in step S304, the center authentication part 22 outputs the challenge to the maintenance part 20. In step S305, receiving the challenge, the maintenance part 20 transmits the challenge to the remote maintenance center 3.

In step S306, receiving the challenge, the remote maintenance center 3 generates authentication data by performing an operation on the challenge using a secret, and transmits the authentication data to the maintenance part 20. In step S307, the maintenance part 20 outputs the authentication data to the center authentication part 22. In the case of requesting authentication, a SOAP interface "internalAuthenticate (byte[ ] authcode): String session" is called, for instance. The authentication data obtained by the operation performed on the challenge using the secret by the remote maintenance center 3 is stored in "authCode."

In step S308, the center authentication part 22 authenticates the remote maintenance center 3 based on whether the results of an operation performed on the challenge with the secret shared with the remote maintenance center 3 are equal to the authentication data transmitted from the remote maintenance center 3. In step S309, the center authentication part 22 stores a numeric value in a return value "session" and outputs the numeric value to the maintenance part 20.

By the maintenance mediation apparatus 7 authenticating the remote maintenance center 3, it is possible to transmit usage condition information only to the remote maintenance center 3 with which a contract is signed in advance, and to prevent the remote maintenance center 3 from being spoofed.

If the remote maintenance center 3 is authenticated in step S310, in step S311, the remote maintenance center 3 issues an instruction to execute a maintenance operation to the maintenance part 20, specifying a maintenance operation type and a maintenance target apparatus.

FIG. 12 shows a SOAP interface in the case of issuing an instruction to execute a maintenance operation. In a paragraph 401, "session," "targetId," "operation," and "parameter" are used in order to specify the maintenance operation, and the result of the maintenance operation is stored in a return value "result." For instance, the maintenance operation is identified by storing a session ID in "session." In "targetId," identification information specifying a maintenance target apparatus is stored. In "operation," the type of the maintenance operation is stored. In "parameter," parameters for executing the maintenance operation of the type are stored. In the second and third lines of a paragraph 402, the type of "parameter" is defined. A parameter name is stored in "name," and a parameter value is stored in "value." In the paragraph 402, the type of "OperationResult," in which the result of the maintenance operation is stored, is defined. If the maintenance operation does not end normally, an error code is stored in "error." The operation result of the maintenance operation is stored in "result."

In each of paragraphs 403 and 404, the maintenance target apparatus is specified in "targetId," and the contents of the maintenance operation are defined in "operation." For instance, in the paragraph 403, "Machine Rebooting" that reboots a machine is defined as a maintenance operation, and in the paragraph 404, "Maintenance Info Retrieval" that causes maintenance information to be obtained (retrieved) is defined as a maintenance operation. In the case of machine rebooting, in how many minutes rebooting is to be performed is defined in the third and fourth lines of the paragraph 403 (in the case of FIG. 12, rebooting is to be performed at the time of receiving an instruction). In the case of causing maintenance information to be obtained, information to be obtained is defined in the second and third lines of the paragraph 404 (in the case of FIG. 12, all information is to be obtained).

Referring back to FIG. 11, in step S312, receiving the SOAP interface, the maintenance part 20 requests the policy determination part 21 to determine whether the maintenance operation is authorized. Receiving the request, first, in step S313, the policy determination part 21 requests the policy management part 25 to obtain a current maintenance policy. In step S314, the policy management part 25 reads out the current maintenance policy, and in step S315, outputs the current maintenance policy to the policy determination part 21.

In step S316, receiving the current maintenance policy, the policy determination part 21 compares the current maintenance policy with the contents of the maintenance operation ordered by the remote maintenance center 3, and determines whether the maintenance operation is authorized. FIGS. 13A and 13B show pseudo code of a SOAP interface in maintenance policy determination performed by the policy determination part 21. First, it is determined based on "OperationResult performRemoteOperation" of FIG. 13A whether "session" is valid. If "session" is not valid, "BAD_SESSION_ERROR" is returned as an error code and the operation ends.

If "session" is valid, the type of the maintenance operation and a parameter for the maintenance operation are stored in "operation" and "params," respectively, of "is AllowedOperation(operation, params)" as the result of the policy determination. If the maintenance operation ordered by the remote maintenance center 3 is not authorized in the current maintenance policy, "NOT_PERMITTED" is returned as an error code, and the operation ends.

If "session" is valid, more specifically, an operation shown in FIG. 13B is performed. When "is AllowedOperation(operation, params)" is called, the policy determination part 21 opens a maintenance policy file (XML data) and reads the maintenance policy into a memory. Next, in the XML data described in FIG. 6, the policy determination part 21 searches for a <Name> element in a <PolicyElement> element below a <RemoteMaintenancePolicy> element the contents of which <Name> element match "operation." If there is no matching <Name> element, "false" (PROHIBITED) is returned, and the operation ends. If there is a matching <Name> element, the policy determination part 21 refers to the <Permission> element of the matching <Name> element, and determines whether the maintenance operation is authorized based on whether the <Permission> element is "allowed" or "denied." By the above-described operation, it is determined whether a specified maintenance operation is authorized by the maintenance policy 5.

Referring back to FIG. 11, in step S317, as a result of reference to the current maintenance policy, the policy determination part 21 outputs the result of determination as to whether the maintenance operation is authorized to the maintenance part 20. In step S318, the maintenance part 20 requests a list of maintenance target apparatuses from the maintenance target apparatus management part 28. In step S319, the maintenance target apparatus management part 28 reads out the list, and in step S320, outputs the list to the maintenance part 20.

In step S321, referring to the maintenance target apparatus list, the maintenance part 20 determines whether the maintenance target apparatus specified by "targetId" is a target of maintenance.

Next, in step S322, the maintenance part 20 requests the maintenance operation execution part 201 to execute the authorized maintenance operation on the specified maintenance target apparatus. In step S323, being requested to execute the maintenance operation, the maintenance operation execution part 201 executes the requested maintenance operation on the specified maintenance target apparatus (maintenance target apparatus #2 in FIG. 11).

FIG. 14 shows pseudo code of a SOAP interface in the case of the maintenance operation execution part 201 executing a maintenance operation. When "OperationResult performOperation" is called, the contents of a maintenance operation are specified in accordance with the contents of "operation." The network address (for instance, IP address or MAC address) of a maintenance target apparatus is specified by "ipAddress." A parameter necessary for the maintenance operation is stored in "params." When such a SOAP interface is called, first, the maintenance operation execution part 201 establishes a connection to the maintenance target apparatus specified by "ipAddress" through the network.

As an example, the pseudo code of FIG. 14 writes about "Machine Rebooting," "HDD Formatting," and "Maintenance Info Retrieval." If "operation" is "Machine Rebooting," the maintenance operation execution part 201 refers to "params" and obtains a rebooting time. Next, the maintenance operation execution part 201 instructs the maintenance target apparatus to perform rebooting, specifying the rebooting time. If "operation" is "HDD Formatting," the maintenance operation execution part 201 instructs the maintenance target apparatus to perform HDD formatting. If "operation" is "Maintenance Info Retrieval," the maintenance operation execution part 201 retrieves maintenance information from the maintenance target apparatus. In each operation, the maintenance operation execution part 201 returns the result of the operation, and ends the operation. If, for instance, an undefined operation is stored in "operation," the maintenance operation execution part 201 returns an error code (INVALID_OPERATION), and ends the operation.

Referring back to FIG. 11, in step S324, the maintenance operation is executed, and in step S325, the maintenance operation execution part 201 receives the result of the operation from the maintenance target apparatus. Then, in step S326, the maintenance operation execution part 201 outputs the operation result to the maintenance part 20. In step S327, the maintenance part 20 transmits a return value to the remote maintenance center 3. Thereby, the maintenance operation by the remote maintenance center 3 is completed.

In the case where the contents of the maintenance operation are acquisition of maintenance information, if provision of specified maintenance information is not prohibited by the maintenance policy 5, the remote maintenance center 3 can obtain the maintenance information. On the other hand, in transmission of periodically provided usage condition information to the remote maintenance center 3, only maintenance information specified as the periodically provided usage condition information is transmitted.

Further, in the sequential operation of FIG. 11, challenge-response is employed as a method of authenticating the remote maintenance center 3. However, any other authentication method is also employable. If there is a network environment that allows establishment of an SSL session between the remote maintenance center 3 and the maintenance mediation apparatus 7 as described above, the remote maintenance center 3 may be authenticated and a subsequent maintenance operation may be prevented from being altered or intercepted using SSL. In FIG. 11, the maintenance operation execution part 201 has the function of executing a maintenance operation. Alternatively, for instance, a maintenance operation such as initialization of the copy number counter of a maintenance target apparatus may be executed by the maintenance information collection part 202. In the case of failing in authenticating the remote maintenance center 3, the instruction to execute a maintenance operation is rejected. The remote maintenance center is notified of the error, and the operation ends.

[When Firewall Is Set]

It may be assumed that the maintenance mediation apparatus 7 is connected to the internal network 4 of users and that a firewall is installed between the external network 1 and the internal network 4. Accordingly, it is suitable that HTTP or SMTP be used as a protocol for transmitting maintenance information from the maintenance mediation apparatus 7 because this makes it possible to transmit maintenance information without providing a special setting for the firewall.

The firewall may be set so as to authorize communications to be started from the internal network 4 to the external network 1, but to block communications started from the external network 1 to the internal network 4.

In this case, the maintenance mediation apparatus 7 queries the remote maintenance center 3 about the presence or absence of an instruction for a maintenance operation, and receives the instruction for a maintenance operation from the remote maintenance center 3 in a response to the query. Starting communication from the internal network makes it possible to receive communications from the external network 1 without changing the settings of the firewall, thus making it possible to process the instruction for a maintenance operation in accordance with a user's policy.

When the maintenance mediation apparatus 7 queries the remote maintenance center 3 about the presence or absence of an instruction for a maintenance operation, the maintenance mediation apparatus 7 calls from the remote maintenance center 3, for instance, a SOAP interface "getRequest(byte[ ] random, byte[ ] authCode, String proxyId): String soapRequestEnvelope" provided by the remote maintenance center 3. The maintenance mediation apparatus 7 stores identification information for authenticating a maintenance target apparatus in "random" and "authCode" of the called SOAP interface, and stores the identification information of the maintenance mediation apparatus 7 in "proxyId" of the called SOAP interface.

When the maintenance mediation apparatus 7 transmits the called SOAP interface to the remote maintenance center 3, the remote maintenance center 3 stores "getChallenge," "internalAuthenticate," or "performRemoteOperation," which is an instruction from the remote maintenance center 3 side, in "soapRequestEnvelope," and transmits the instruction to the maintenance mediation apparatus 7.

The maintenance mediation apparatus 7 communicates with the remote maintenance center 3 using a SOAP interface "putResult(String soapResultEnvelope): String error." The maintenance mediation apparatus 7 stores the return value of "getChallenge," "internalAuthenticate," or "performRemoteOperation" and a SOAP envelope of an "out" argument in "soapResultEnvelope."

Periodic queries from the maintenance mediation apparatus 7 to the remote maintenance center 7 enable the remote maintenance center 3 to perform a maintenance operation with predetermined timing even with a firewall. For instance, the remote maintenance center 3 may perform a maintenance operation after every automatic provision interval. Alternatively, transmission may also be performed once at a predetermined time every day or performed every minute.

Accordingly, even if the firewall prevents the maintenance mediation apparatus 7 from receiving maintenance operation instruction information from the remote maintenance center 3, the maintenance mediation apparatus 7 can receive maintenance operation instruction information as a response to an operation query.

[Program Providing Remote Maintenance Function]

The remote maintenance function of the maintenance mediation apparatus 7 can be provided as software. Specifically, a maintenance program for causing a computer to implement the maintenance operation instruction information reception part 203, the usage condition information transmission part 204, the operation query part 205, the usage condition information encryption part 206, the maintenance operation determination part 211, the usage condition information determination part 212, the maintenance center authentication part 221, the maintenance operation instruction information transmission part 2011, the usage condition information retrieval part 2021, the usage condition information collection part 2022, the administrator authentication processing part 261, and the maintenance policy updating part 251 described in FIG. 2 is installed in a predetermined computer. The computer in which the maintenance program is installed can provide the function of the maintenance mediation apparatus 7.

The maintenance program may be recorded in a recording medium such as the CD-ROM 30 of FIG. 2 and distributed. Alternatively, the maintenance program may also be downloaded through the external network 1.

In particular, if a maintenance target apparatus treats software as a product as the electronic document management server 6, it is suitable that the remote maintenance function should be provided as a program. This makes it possible to perform remote maintenance such as software upgrading on the electronic document management server 6, and also makes it possible to install the maintenance program in the electronic document management server 6.

That is, if it is possible to provide the maintenance program independently, it is possible to add the remote maintenance function to a maintenance target apparatus after its purchase, and it is possible to install the remote maintenance function in the MFP 2 and the electronic document management server 6. In this case, by writing the maintenance policy 5 in XML and configuring the maintenance program of SOAP interfaces, it is also possible to construct a flexible remote maintenance system indifferent to the OS of a computer or a maintenance target apparatus in which to install the maintenance program.

As described above, according to this embodiment, a maintenance mediation apparatus, a maintenance target apparatus maintenance method, and a maintenance system that can maintain a maintenance target apparatus from an external network in accordance with a user's policy can be provided. Further, a computer-readable recording medium on which a program for causing a computer to execute such a maintenance target apparatus maintenance method is recorded can also be provided.

The maintenance mediation apparatus 7 can obtain maintenance information from a maintenance target apparatus and periodically transmit the maintenance information to the remote maintenance center 3 in accordance with the maintenance policy 5 determined by a user. Since it is possible to encrypt and transmit the maintenance information, it is possible to prevent interception and alteration. When an instruction for an operation is received from the remote maintenance center 3, an operation authorized by the maintenance policy 5 is executed.

The maintenance policy 5 can be set for each maintenance target apparatus. Accordingly, it is possible to realize maintenance according to each user's maintenance policy. At the time of inputting the maintenance policy 5, the administrator is authenticated. Accordingly, it is possible to prevent spoofing. Further, in the case of inputting the maintenance policy 5 with a recording medium, putting an electronic signature to the maintenance policy 5 makes it possible to prevent a third party from setting or altering the maintenance policy 5.

Further, even if there is a firewall between the remote maintenance center 3 and the maintenance mediation apparatus 7, the maintenance mediation apparatus 7 can receive an instruction for an operation from the remote maintenance center 3 as a response to a query or periodic transmission of maintenance information from the maintenance mediation apparatus 7.

Further, even a maintenance target apparatus without the function of receiving remote maintenance directly from the remote maintenance center 3 can receive the remote maintenance through the maintenance mediation apparatus 7. Even when a user possesses multiple maintenance target apparatuses, it is easy to receive remote maintenance under a consistent maintenance policy. In particular, when the multiple maintenance target apparatuses are of different types, the user's maintenance policy can be shared.

Further, using XML or SOAP messages for the communications between the maintenance mediation apparatus 7 and the remote maintenance center 3 makes it possible to execute a maintenance operation from a remote location without dependence on an OS or architecture.

The present invention is not limited to the specifically disclosed embodiment, and variations and modifications may be made without departing from the scope of the present invention.

The present application is based on Japanese Priority Patent Applications No. 2004-245527, filed on Aug. 25, 2004, No. 2005-174362, filed on Jun. 14, 2005, and No. 2005-238755, filed on Aug. 19, 2005, the entire contents of which are hereby incorporated by reference.

What is claimed is:

1. A maintenance mediation apparatus mediating maintenance operation instruction information from a maintenance center to a maintenance target apparatus on which the maintenance center causes a maintenance operation to be performed, the maintenance center being connected to the maintenance target apparatus through a network, the maintenance mediation apparatus comprising:

an operation part configured to register the maintenance target apparatus;

a maintenance target apparatus management part configured to manage the maintenance target apparatus registered by the operations part;

a policy management part configured to store a maintenance policy, the maintenance policy including information on what maintenance information to transmit and the frequency of transmission of the maintenance information;

a maintenance part configured to transmit information on the maintenance target apparatus managed by the maintenance target apparatus management part to the maintenance center; and a policy determination part configured to, in response to reception of the maintenance operation instruction information from the maintenance center, determine whether the maintenance operation on the maintenance target apparatus is authorized or prohibited referring to the policy management part, and to transmit a result of the determination to the maintenance part.

2. The maintenance mediation apparatus as claimed in claim 1, wherein the policy management part is configured to store the maintenance policy on a maintenance-target-apparatus basis.

3. The maintenance mediation apparatus as claimed in claim 1, wherein the maintenance part is configured to perform the maintenance operation based on the result of the determination of the policy determination part.

4. The maintenance mediation apparatus as claimed in claim 1, further comprising:

a remote maintenance condition setting part configured to receive the maintenance policy, and to receive processing for authentication at a time of one of registering the maintenance target apparatus and inputting the maintenance policy.

5. The maintenance mediation apparatus as claimed in claim 4, wherein the remote maintenance condition setting part is configured to register the maintenance target apparatus with the maintenance target apparatus management part and to display a registered maintenance target apparatus list on the operations part only upon verification of the authentication.

* * * * *